(12) United States Patent
Mukundan

(10) Patent No.: US 12,337,870 B1
(45) Date of Patent: Jun. 24, 2025

(54) HEURISTIC AND MACHINE LEARNING AGENTS IN DRIVING SIMULATIONS

(71) Applicant: Zoox, Inc., Foster City, CA (US)

(72) Inventor: Priam Mukundan, Milpitas, CA (US)

(73) Assignee: Zoox, Inc., Foster City, CA (US)

( * ) Notice: Subject to any disclaimer, the term of this patent is extended or adjusted under 35 U.S.C. 154(b) by 448 days.

(21) Appl. No.: 17/957,660

(22) Filed: Sep. 30, 2022

(51) Int. Cl.
*B60W 60/00* (2020.01)
*G06N 3/045* (2023.01)
*G06N 5/04* (2023.01)
*G06N 5/043* (2023.01)

(52) U.S. Cl.
CPC ......... *B60W 60/0011* (2020.02); *G06N 3/045* (2023.01); *G06N 5/042* (2013.01); *G06N 5/043* (2013.01)

(58) Field of Classification Search
CPC ......... B60W 30/0956; B60W 60/0027; B60W 60/0011; G06N 20/00
See application file for complete search history.

(56) References Cited

U.S. PATENT DOCUMENTS

| | | | |
|---|---|---|---|
| 2019/0031204 A1* | 1/2019 | Hartmann | G05B 13/048 |
| 2022/0269836 A1* | 8/2022 | Mukundan | G07C 5/085 |
| 2023/0339459 A1* | 10/2023 | Chi-Johnston | G06F 11/3668 |

* cited by examiner

*Primary Examiner* — Shon G Foley
(74) *Attorney, Agent, or Firm* — Lee & Hayes, P.C.

(57) ABSTRACT

Techniques are described herein for executing driving simulations where control of simulated agents is switched between different programmatic planners based on different driving scenarios encountered in the simulation. As an example, a simulation system may execute a driving simulation including a programmatic agent initially controlled using a heuristic planner. During the execution of the simulation, the simulation system may detect one or more driving scenarios for which the heuristic planner is unable to navigate the environment or may determine an unrealistic trajectory for the simulated agent. Based on detecting a driving scenario, the simulation system may determine a machine-learned planner to control the simulated agent to navigate the driving scenario. After the driving scenario has been successfully traversed by the simulated agent using the machine-learned planner, the simulation system may switch the control of the simulated agent back to the heuristic planner to continue the simulation.

20 Claims, 9 Drawing Sheets

SIMULATED DRIVING ENVIRONMENT 400

SIMULATION TIME (T=0)

Vehicle 404 – Playback Agent
Vehicle 406 – Heuristic Agent
Vehicle 408 – Playback Agent
Bicycle 410 – Playback Agent
Pedestrian 412 – Playback Agent

SIMULATION TIME (T=1)

Vehicle 404 – ML Agent
Vehicle 406 – ML Agent
Vehicle 408 – Playback Agent
Bicycle 410 – Playback Agent
Pedestrian 412 – Playback Agent

SIMULATED DRIVING ENVIRONMENT 400

SIMULATION TIME (T=2)

Vehicle 404 – ML Agent
Vehicle 406 – ML Agent
Vehicle 408 – Playback Agent
Bicycle 410 – Playback Agent
Pedestrian 412 – Playback Agent

SIMULATION TIME (T=3)

Vehicle 404 – Heuristic Agent
Vehicle 406 – Heuristic Agent
Vehicle 408 – Playback Agent
Bicycle 410 – Playback Agent
Pedestrian 412 – Playback Agent

SIMULATED DRIVING ENVIRONMENT 500

SIMULATION TIME (T=0)

Vehicle 504 – Heuristic Agent
Vehicle 506 – Heuristic Agent
Vehicle 508 – Heuristic Agent
Vehicle 510 – Heuristic Agent

SIMULATION TIME (T=1)

Vehicle 504 – Reinforcement Learning Agent
Vehicle 506 – Heuristic Agent
Vehicle 508 – Heuristic Agent
Vehicle 510 – Heuristic Agent

SIMULATED DRIVING ENVIRONMENT 500

SIMULATION TIME (T=2)

Vehicle 504 – Reinforcement Learning Agent
Vehicle 506 – Supervised Learning Agent
Vehicle 508 – Inv. Reinforcement Learning Agent
Vehicle 510 – Heuristic Agent

SIMULATION TIME (T=3)

Vehicle 504 – Reinforcement Learning Agent
Vehicle 506 – Heuristic Agent
Vehicle 508 – Heuristic Agent
Vehicle 510 – Heuristic Agent

HEURISTIC AND MACHINE LEARNING AGENTS IN DRIVING SIMULATIONS

BACKGROUND

Simulations can be used to test and validate the features and functionalities of systems, including those that may be otherwise prohibitive to test in real world environments for example, due to safety concerns, limitations on time, repeatability, etc. For example, autonomous vehicles may use driving simulations to test and improve the performance of the vehicle control systems with respect to passenger safety, vehicle decision-making, sensor data analysis, route optimization, and the like. However, driving simulations that accurately reflect real world scenarios may be difficult and expensive to create and execute, as the data used to create such simulations may be noisy, inconsistent, or incomplete. Additionally, execution of driving simulations may involve executing multiple different interacting systems and components, including the vehicle control systems being evaluated, as well as agents and other objects in the simulated environment, which may be resource and computationally expensive.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
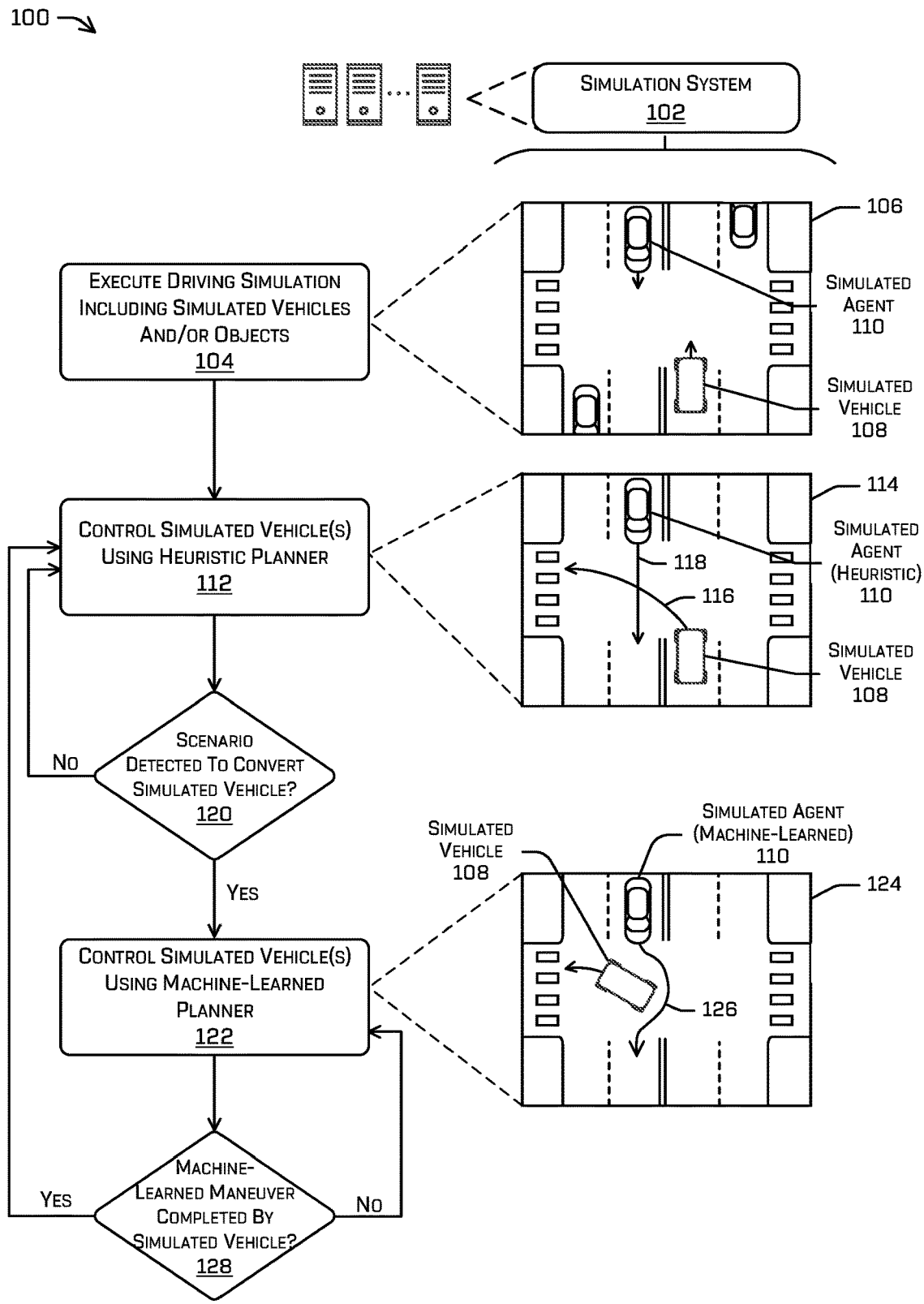
FIG. 1 illustrates an example process of executing a driving simulation and controlling agents using different planner components during the simulation, in accordance with one or more implementations of the disclosure

Techniques are described herein for executing driving simulations to evaluate the performance and functionalities of vehicle controllers. In various examples, a simulation system may execute a driving simulation including a simulated vehicle controlled by a vehicle controller within a simulated driving environment. The simulated environment may include any number of additional programmatic agents, that may interact with or may otherwise affect the behavior of the simulated vehicle during the simulation. For example, the additional programmatic agents in a simulation may include "playback agents" that are controlled based on log data associated with corresponding agents previously observed in a real driving environment, and/or "smart agents" that are controlled by a planning component. In order for a driving simulation to evaluate the vehicle controller of a simulated vehicle robustly and effectively, the additional agents in the simulation should operate in a realistic manner when performing driving maneuvers and reacting to complex driving situations. However, generating and operating such agents in complex driving simulations can be technically challenging and costly in terms of time and computational resources.

To perform more realistic and valuable driving simulations, the techniques described herein include executing simulations in which the control of various simulated agents is switched between different programmatic planners based on different driving scenarios encountered in the simulation. For example, a simulation system may execute a driving simulation including one or more programmatic agents operating in a simulated environment, where the behavior of the programmatic agents is initially controlled using a heuristic planner. A heuristic planner may control a simulated agent using a rules-based algorithm (e.g., logical rules, hand-coded if/else statements, etc.), so that the trajectories followed and/or actions performed by the simulated agent are determined by applying the rules to the current simulated environment state. During the execution of the simulation, the simulation system may detect a particular driving scenario, and may switch to using a machine-learned planner to control the simulated agent based on the driving scenario. The detected driving scenario may be a scenario encountered by the simulated agent, for which the heuristic planner is unable to navigate the environment and/or where the trajectory/behavior determined by the heuristic planner for the simulated agent may be unrealistic. In this example, the simulation system may switch to the machine-learned planner to determine a trajectory and/or control the simulated agent to perform one or more driving maneuvers to navigate the driving scenario. After the driving scenario has been successfully traversed by the simulated agent using the machine-learned planner, the simulation system may switch the control of the simulated agent back to the heuristic planner to continue the simulation.

As described in the above example, a simulated agent may switch from a heuristic planner to a machine-learned planner when detecting a specific driving scenario, and then may switch back to the heuristic planner after the simulated agent has navigated the driving scenario. In other examples, similar or identical techniques to those described herein may be used to control a simulated agent to switch from a machine-learned planner to a heuristic planner in response to specific driving scenarios, and then switch back to the machine-learned planner after navigating the scenario. Additionally, although certain examples herein describe toggling a simulated agent between one heuristic planner and one machine-learned planner, in other examples, the control for a simulated agent may be switched between any number of heuristic planners and/or any number of machine-learned planners. As described below, the simulation system may train and store one or more driving policies for various simulation scenarios that may be encountered by a simulated agent, including one or more supervised learning policies, reinforcement learning policies, and/or inverse reinforcement learning policies for a driving scenario. Additionally or alternatively, the simulation system may include one or multiple heuristic planners that can be applied generally to all driving scenarios and/or heuristic planners that are applicable to specific driving scenarios.

In some examples, the simulation system may monitor the execution of a driving simulation to determine particular conditions in the simulation associated with a particular driving scenario. When detecting the particular driving scenario within the simulation, the simulation system may switch control of one or more of the simulated agents to different planners (e.g., a heuristic planner to a machine-learned planner, or vice versa). As described in more detail below, such driving scenarios may include complex situations and/or situations in which a heuristic planner may not perform accurately/realistically, such as deadlock negotiation scenarios, merging scenarios, unprotected turning scenarios, etc. The simulation system may maintain a listing of specific driving scenarios, including the specific states/conditions in a simulation that define the starting and ending points of the scenarios, and may periodically evaluate the driving simulation to determine when such a scenario has occurred. Based on determining that a particular driving scenario has started or ended, the simulation system may switch control of one or more simulated agent(s) to different planner(s) based on an association between the particular driving scenario and one or more planner components. In some examples, the simulation system may use mappings between particular driving scenarios and associated planners. Additionally or alternatively, the simulation system may use additional factors to determine when to switch control of a simulated agent to a different planner, and which planner to use to control the simulated agent. Such additional factors may include, but are not limited to, the current time in the driving simulation and/or time remaining in the simulation, the agent type and/or various other attributes of the simulated agent, the distance of the simulated agent from the simulated vehicle being evaluated in the simulation, etc.

As described in more detail below, the techniques described herein provide a number of improvements and technical advantages for generating and executing driving simulations. By providing driving simulations that include more realistic simulated agents, the driving simulations themselves may represent real-world driving scenarios more accurately and may be more valuable for evaluating the performance of vehicle controllers for autonomous and semi-autonomous vehicles. Further, the use of programmatic simulated agents using heuristic and/or machine-learned planners may allow the simulated agents to respond dynamically to simulation changes in a realistic manner, making the driving simulations described here more robust and more durable when evaluating changes in vehicle controllers. For example, in some simulation systems, when a driving simulation produces a collision or a road blockage involving a simulated agent, the simulation may be invalidated and/or discarded from a simulation test battery. As a result, simulation scenario tests in such systems are often short-lived and may quickly become outdated, since any change to the vehicle controllers of the simulated vehicle may cause the simulation to be invalidated. In contrast, the techniques described herein provide more realistic and responsive simulated agents, which may result in robust and enduring simulations that operate over longer periods of time with fewer failures, and less need for intervention and manual analysis, thereby increasing the number of usable simulation test and improving the efficiency and quality of the simulation system.

Additionally, by switching control of the simulated agents between one or more heuristic planners and/or machine-learned planners, the techniques described herein effectively leverage the advantages of both heuristic and machine-learned vehicle navigation and trajectory planning. For instance, heuristic planners may be quick and resource-efficient to execute driving simulations, and may provide sufficiently realistic agent behavior for most driving situations. However, in certain driving scenarios, heuristic planners may be unable to control a simulated agent effectively and/or realistically during the simulation. Machine-learned planners, in contrast, may provide more realistic agent behaviors in many complex driving scenarios, but can be time-consuming and resource-intensive to train and execute for large numbers of driving scenarios. In some cases, for driving scenarios including many simulated agents, it may be prohibitively expensive in terms of computing resources to use machine-learned planners to control all of the simulated agents during the entire driving simulation. Machine-learned planners in such cases may be unnecessary for many agents and/or in many driving scenarios, where a lower-cost heuristic planner may perform just as well if not better. Additionally, machine-learned planners may be impractical or impossible to generate for certain driving scenarios where a sufficient amount of training data does not exist to train an accurate network.

To leverage the advantages of both heuristic and machine-learned planners, techniques are described herein for dynamically switching between different planners (and/or different planner types/modalities) during a simulation, effectively creating a "hybrid" simulated agent that uses heuristic planning at some times and machine-learned planning at other times during a simulation. Thus, the simulated agents described herein include the advantages of speed and efficiency provided by heuristic planners, as well as the realistic behaviors and the ability to handle complex driving situations provided by machine-learned planners. As described herein, machine-learned driving policies can be generated and applied for a limited set of driving scenarios, including complex driving situations/maneuvers where a heuristic planner might not perform realistically, but such machine-learned policies need not be generated for all (or even most) driving scenarios that may be encountered during a simulation. Therefore, various machine learning techniques described herein (e.g., supervised learning, reinforcement learning, inverse reinforcement learning, etc.) can more efficiently train networks to navigate specific and limited sets of driving scenarios, while relying on lower-cost heuristic-based navigation for other scenarios.

The techniques described herein may be implemented in a number of ways. Example implementations are provided below with reference to the following figures. Although certain examples are discussed in the context of autonomous vehicles and log-based driving simulations, in other examples, the methods, devices, systems, computer-readable media, and/or other implementations described herein may be applied to a variety of other environments, such as utilization in semi-autonomous or non-autonomous vehicles, and/or within aviation or nautical contexts.

FIG. 1 depicts an example technique of executing a driving simulation, including controlling simulated agents during the driving simulation using a combination of different planner components. As described above, in order to effectively evaluate the vehicle controllers of simulated vehicles during driving simulations, the simulated environment and/or additional simulated agents should realistically reflect driving scenarios that may be encountered in real-world driving situations. To achieve more realistic driving simulations, the techniques described herein relate to switching control of simulated agents between different programmatic planners during driving simulations, based on different driving scenarios encountered in the simulations. In various implementations, some or all of the operations in process 100 may be performed by driving simulation systems, such as the simulation system 102, described in more detail below.

At operation 104, a simulation system 102 may execute a driving simulation including a simulated vehicle and/or additional simulated agents driving in a simulated environment. As noted above, driving simulations can be used to test and validate the features and functionalities of vehicle control systems, to improve passenger safety and comfort, vehicle decision-making, sensor data analysis, route optimization, and the like. During a driving simulation, a simulated vehicle may be controlled by one or more vehicle control systems (or vehicle controllers) to traverse a simulated environment. The simulated environment may include roads and/or other driving surfaces, as well as a number of additional simulated objects, including static objects (e.g., buildings, bridges, signs, curbs, sidewalks, etc.) and/or simulated agents such as other simulated vehicles (e.g., cars, trucks, trains, etc.), simulated pedestrians, simulated bicyclists, etc. During the driving simulation, the simulation system may use the vehicle controller(s) to control the simulated vehicle, and may evaluate the performance of the vehicle controller(s) based on the actions of the simulated vehicle during the simulation.

In general, performing driving simulations based on many different and diverse driving scenarios (or driving situations) can provide the most effective testing and validation of the vehicle control systems. As used herein, a driving scenario (or driving situation) in a simulation may refer to a particular configuration of simulated vehicles and/or agents in the simulated environment, a particular state of one or more simulated vehicles and/or agents in the simulated environment, and/or a driving maneuver to be performed during by one or more of the simulated vehicles and/or agents during a simulation. Different driving scenarios may be associated with different types of driving environments (e.g., city driving scenarios, highway driving scenarios, two-way or four-way stop intersection scenarios, parking lot scenarios, etc.), as well as different configurations of static and dynamic objects in the simulated environment. For instance, a single driving simulation may include any number of driving scenarios, where each driving scenario corresponds to a particular arrangement of the simulated objects and/or agents in the simulated environment. Driving scenarios may correspond to time periods during a simulation in which the simulated vehicle that is being evaluated encounters and traverses a particular driving scene or situation, and/or when another simulated agent in the simulation encounters and traverses a particular driving scene or situation.

As shown in box 106, the driving simulation in this example includes a simulated environment including a four-way intersection. The driving scenario depicted in box 106 includes a simulated vehicle 108 and a simulated agent 110 approaching the intersection at the same time from opposite directions. In this example, the simulated vehicle 108 may be controlled by vehicle control system(s) during the simulation, and the simulation system 102 may analyze the movements and/or behaviors of the simulated vehicle 108 to evaluate the performance of the vehicle control system(s) during the simulation. In contrast, the simulated agent 110 may be controlled by one or more object controllers within the simulation system 102, described in more detail below. Thus, in this example, the simulation system 102 may control both the simulated vehicle 108 and the simulated agent 110 during the simulation, although it may use different controllers/control systems to control the different vehicles and/or agents. The simulated agent 110 in this example may be referred to as a simulated agent because it is controlled by a separate object controller of the simulation system 102, rather than the vehicle control system(s) that are being evaluated during the simulation. However, as shown in box 106, the simulated agent 110 in this example is a vehicle (e.g., a car) and thus also may be referred to as a simulated vehicle. Thus, the techniques described herein for switching control of simulated agents between different programmatic planners during driving simulations may apply to simulated vehicles such as the simulated agent 110, and/or additional types of simulated agents including simulated pedestrians, simulated bicycles, etc.

The driving simulation generated and executed (e.g., run) by the simulation system 102 in operation 104 may include a log-based simulation including driving scenarios captured from log data, and/or may include a synthetic simulation including synthetic driving scenarios. In some examples, the simulation system 102 may generate log-based simulations based on the driving log data corresponding to one or more particular driving scenarios. For instance, the simulation system 102 may generate log-based simulations utilizing techniques such as those described in U.S. patent application Ser. No. 16/376,842, filed Apr. 5, 2019 and entitled "Simulating Autonomous Driving Using Map Data and Driving Data," U.S. patent application Ser. No. 16/555,988, filed Aug. 29, 2019 and entitled "Vehicle Controller Simulations," U.S. patent application Ser. No. 17/184,128, filed Feb. 24, 2021 and entitled "Agent Conversions in Driving Simulations," U.S. patent application Ser. No. 17/184,169, filed Feb. 24, 2021 and entitled "Simulating Agents based on Driving Log Data," the entire contents of which are incorporated herein by reference for all purposes. In examples using log-based driving simulations, the scenarios upon which driving simulations are generated may be based on driving log data captured in real physical environments.

In other examples, the driving simulation executed in operation 104 may be generated based on synthetic driving scenarios. A synthetic driving scenario may be created, ab initio, programmatically, and need not be based on any driving log data captured from a physical environment. In other instances, synthetic driving scenarios may be generated by adding, removing, and/or modifying various static or dynamic objects from log-based driving scenarios. For driving simulations based on either synthetic or log-based driving scenarios, the driving simulation in operation 104 may be associated with an entire driving scenario or a portion of a scenario. For instance, a driving simulation may represent a period of time (e.g., 20 seconds, 30 seconds, 45 seconds, etc.) that is less than a total time associated with the log-based or synthetic driving scenario.

At operation 112, during the execution of the driving simulation, the simulation system 102 may control one or more simulated vehicle agents using a heuristic planning component (or heuristic planner). As described above, heuristic planners may control simulated agents using rules-based algorithms including sets of logical rules, hand-coded if/else statements, etc., as well as the operational parameters associated with the simulated agent. Periodically during the simulation, the simulation system 102 may use the heuristic planner to determine a trajectory for the simulated agent 110 to follow and/or an action for the simulated agent 110 to perform, by applying the heuristic planner rules to the simulated environment state and simulated agent state and operational parameters.

When using a heuristic planner to control a simulated vehicle agent, such as the simulated agent 110, the simulation system 102 may initiate an object controller and determine a set of operational parameters that the object controller can use to control the state and/or behaviors of the simulated agent. For instance, the operational parameters used to control the simulated agent 110 may include parameters that define the starting location, pose, trajectory, velocity, and/or acceleration of the simulated agent at the beginning of the driving simulation, as well as the intended destination and/or driving route for the simulated agent 110 during the simulation. Additionally or alternatively, the heuristic planner may include a set of navigation rules for the simulated agent 110, including data values and/or settings that can be used by the object controller(s) to determine the navigation decisions, movements, and/or other behaviors of the simulated agent 110 while traversing the simulated environment towards its intended destination. For instance, the heuristic planner used in operation 112 may include parameters determining the velocities at which the simulated agent 110 moves during a simulation, its acceleration and/or deceleration rates, its following distances, its lateral acceleration rates during turning, its stopping locations relative to stop signs and crosswalks, etc. The rules and/or parameters used by the heuristic planner also may determine the navigation decisions that the simulated agent 110 may perform during the simulation, including but not limited to how the simulated agent 110 performs route planning, whether or not the simulated agent 110 will use bike lanes when determining a route, whether the simulated agent 110 will use lane splitting and/or lane sharing, the desired cruising speed of the simulated agent 110 relative to the speed limit (e.g., based on object type), the maximum possible speed and acceleration of the simulated agent 110 (e.g., based on object type), the desired distances of the simulated agent 110 from other objects/agents in the simulated environment (e.g., based on object type), how the simulated agent 110 will respond to traffic lights, stop signs, yield signs, stop lines, school zones, construction zones, when the simulated agent uses turn signals, turns on/off lights, and/or engages other vehicle controls, how the simulated agent 110 will react to potential interactions with other simulated objects, and so on.

As shown in box 114, as the driving simulation executes, the simulated vehicle 108 and the simulated agent 110 continue to approach the same intersection. At this point during the simulation, the simulated vehicle 108 decelerates as it intends to follow the trajectory 116 to perform a left turn at the intersection. The simulated agent 110 intends to follow the trajectory 118 to proceed straight through the intersection.

Although this example describes using a heuristic planner to control the simulated agent 110 (and/or other simulated agents in the simulation), in other examples the simulation system 102 can use any combination of programmatic planning components to control the simulated agents in a driving simulation. In some cases, the simulation system 102 may use the same object controller running the same heuristic planner to control multiple simulated agents (e.g., simulated vehicles) in a simulation. In other cases, different simulated agents in the same simulation may be controlled using different object controllers and/or different heuristic planners. For instance, the simulation system 102 may include any number of different heuristic planners, each heuristic planner having a different associated set of driving rules and/or operational parameters to control simulated agents during a driving simulation. The simulation system 102 may select a particular heuristic planner based on, for example, the agent type and/or agent attributes (e.g., vehicle classification, size, driving capabilities, etc.), the driving environment of the simulation (e.g., highway driving, city driving, unstructured driving, etc.), and/or the driving conditions of the simulation (e.g., weather conditions, lighting, road surface conditions, traffic conditions, etc.).

At operation 120, the simulation system 102 may evaluate the current state of the simulation to detect one or more driving scenarios that may cause the simulation system 102 to switch the control of the simulated agent 110 to a different planner. In some examples, the simulation system 102 may store a set of driving scenarios that may be encountered in the simulation that may be used to switch the control of a simulated agent from one planner to another. For each driving scenario that may cause a switch between planners for one or more simulated agents, the simulation system 102 can store criteria defining the driving scenario. At periodic intervals during the simulation, the simulation system 102 may evaluate the current state of the simulation (e.g., including the current states of the simulated agents) to determine whether or not the simulation currently includes any of the driving scenarios. For instance, the simulation system 102 may perform the evaluation in operation 120 at periodic time intervals (e.g., 0.1 secs, 0.5 secs, etc.) or based on longitudinal distance intervals traveled by the simulated vehicle 108 or each simulated agent 110 (e.g., 1 meter, 5 meters, 10 meters, etc.). Each time that operation 120 is performed during a simulation, when the simulation system 102 determines that the current state of the simulation does not include a driving scenario that may cause a switch between planners for one or more simulated agents (120: No), then process 100 may return to operation 112 to continue executing the simulation using its existing object controller(s) and/or existing planner(s) (e.g., the heuristic planner) to control the simulated agents in the simulation. However, when the simulation system 102 determines that the current state of the simulation includes a driving scenario that may cause a switch between planners for one or more simulated agents (120: Yes), then process 100 may switch control of the simulated agent(s) in operation 122, discussed below.

In various examples, the simulation system 102 may designate any driving scenario and/or any combination of driving scenarios that may occur in the driving simulation, to be used as a trigger to switch the control of one or more simulated agents from an existing planner to a new planner. In some examples, the simulation system 102 may designate a predetermined set of driving scenarios, including scenarios that the heuristic planner is unable to handle properly and/or scenarios in which a different planner (e.g., a machine-learned planner) may provide more realistic driving behaviors for the smart agents in the simulation. Such scenarios may include, but are not limited to complex driving scenarios and/or driving scenarios requiring the simulated agent to perform a particular driving maneuver.

For instance, referring again to box 114, this example may represent a driving scenario in which the trajectories currently being followed by the simulated vehicle 108 and the simulated agent 110 may intersect at a future time. One or both of the vehicles may detect the intersection of trajectories and may react to avoid a potential collision. In some instances, the detection of this driving scenario in operation 120 may cause the simulation system 102 to switch the control of the simulated agent 110 to a different planner (e.g., a machine-learned planner) so that the simulated agent 110 may behavior more realistically in this driving scenario.

As noted above, the simulation system 102 may detect any number of driving scenarios in operation 120 that can be used to trigger a planner switch for a simulated agent during the driving simulation. In various examples, the simulation system 102 may determine and compare the trajectories and/or driving paths being followed by the simulated agent 110, the simulated vehicle 108, and/or any number of additional simulated agents/objects during the simulation. Based on the analysis of the vehicle trajectories and/or driving paths of the vehicles/agents, the simulation system 102 may determine that one or more of the simulated agents 110 should be switched to a different planner. As described in the examples below, such determinations may be based on potential collisions, agent blockages, deadlock negotiation situations involving agents, complex or high-risk driving maneuvers, etc.

As used herein, a trajectory and/or a driving path for a simulated vehicle (e.g., simulated vehicle 108 or simulated agent 110) may correspond to a route including a starting position (e.g., a start state) and an end position (e.g., an end state), through which the simulated vehicle may traverse. For a particular driving route, there are any number of possible trajectories and/or paths that the simulated vehicle may take to traverse from the start state to the end state, including different positions, steering angles, velocities, and/or accelerations at the different intermediate points along the route. In some examples, a driving route may pass through a portion of a single lane and/or roadway, which can be straight or can include any number of curves or obstacles around which the simulated vehicle may navigate from the start state to the end state. In other examples, driving routes may pass through more complex environments and/or include more complex driving maneuvers, such as lane changes, merging lanes, junctions, intersections, and the like, through which the simulated vehicle may navigate between the start state and the end state.

As used in these examples, a "path" may refer to a sequence of spatial (e.g., geometric) states, in which each spatial state corresponds to a point or position in the path, and each spatial state includes a combination of geometric data such as an x-position, y-position, yaw, and/or steering angle, etc. In contrast, in such examples, a "trajectory" may refer to a sequence of spatiotemporal states rather than geometric states. For example, a trajectory may be defined as a sequence of spatiotemporal states, in which each state is specified by any combination of an x-position, a y-position, a yaw, a yaw rate, a steering angle, a steering angle rate, a velocity, and/or an acceleration, etc.

Similarly, in various examples described herein, trajectories and/or driving paths may be determined as sequences of positions (or points), or as sequences of states. As used in such examples, a "position" (or "point") may refer to a geometric (or spatial) state including position data (e.g., x-position, y-position, yaw, steering angle, etc.). In contrast, in such examples, a "state" may refer to a combination of a geometric state and/or a temporal state, which may include x-position, y-position, yaw, yaw rate, steering angle, steering angle rate, velocity, and/or acceleration, etc. In practice, a simulated vehicle may be controlled to implement numerous trajectories and/or driving paths, and to pass through numerous individual points, positions, and/or states while navigating along the route from the starting position (e.g., start state) to the end position (e.g., end state) in the simulated environment.

As an example, in operation 120, the simulation system 102 may compare the trajectory of the simulated agent 110 to the trajectories of any or all of the other simulated vehicles and/or agents in the simulation. In this example, when detecting a potential collision involving the simulated agent 110 based on the trajectories, the simulation system 102 may determine that the simulated agent 110 should be switched to a different planner (120: Yes).

As an example, the simulation system 102 may compare the trajectory of the simulated agent 110 to the trajectories of the other simulated vehicles and/or agents in the simulation, to determine a deadlock negotiation driving scenario. For instance, in a deadlock negotiation, the simulated agent 110 and another simulated agent can be stuck in a deadlock situation in which each is stopped and waiting for the other to move before continuing along its driving path. In this example, when detecting a deadlock negotiation involving the simulated agent 110, the simulation system 102 may determine that the simulated agent 110 should be switched to a different planner (120: Yes).

As another example, the simulation system 102 may analyze the configuration of objects/agents in the simulation to determine that the driving path of the simulated agent 110 is blocked. For instance, a driving path blockage may be caused by a road closure, construction zone, accident, etc. In some cases, a heuristic planner may respond to path blockages by stopping the simulated agent 110 indefinitely, whereas a machine-learned planner may respond in a more realistic manner (e.g., by performing an ad hoc abnormal driving maneuver to circumvent the blockage). In this example, when detecting that the simulated agent 110 is blocked, the simulation system 102 may determine that the simulated agent 110 should be switched to a different planner (120: Yes).

As another example, the simulation system 102 may analyze the simulated environment, including the positions and driving routes/trajectories of the various objects and agents, to determine that the simulated agent 110 may be required to perform a relatively high-risk or complex driving maneuver. Examples of such maneuvers may include, but are not limited to, merging, unprotected turns, parallel parking, and/or driving maneuvers in unstructured environments (e.g., parking lots, construction zones, etc.). In these examples, when detecting that the simulated agent 110 may be required to perform a particular driving maneuver, the simulation system 102 may determine that the simulated agent 110 should be switched to a different planner (120: Yes).

As described in the examples above, the simulation system 102 may monitor an executing simulation to determine particular conditions that may cause a simulated agent to be switched to a different planner. Additionally or alternatively, such determinations may be made by the object controllers and/or the planners themselves that are controlling the simulated agents. For instance, a planner for a simulated agent 110 (e.g., a heuristic or a machine-learned planner) may be configured to output a request to the simulation system 102 requesting that the planner be switched to a different planner type in response to the simulated agent 110 encountering a particular scenario. For example, when a heuristic planner encounters a situation outside of a predetermined rule set, or a situation in which its driving rules have caused the simulated agent not to be able to move for a threshold period of time, then the heuristic planner may request that the simulation system 102 switch its planner to a machine-learned planner (or vice versa). In some examples, a catalog of various scenario-specific models may be applied to a planner for a simulated agent 110 wherein a model may be selected based on a corresponding scenario encountered by simulated agent 110.

At operation 122, based on detecting the driving scenario in operation 120, the simulation system 102 may switch the simulated agent 110 from being controlled by the heuristic planner to being controlled by a machine-learned planner. As described below, the simulation system 102 may train and store one or more machine-learned driving policies (e.g., neural networks) that, when executed via a machine-learned planner, determine the driving behaviors and/or trajectories for the simulated agent 110 to follow to traverse the driving scenario. The machine-learned planners stored by the simulation system 102 may include scenario-specific driving policies trained using supervised learning techniques, reinforcement learning techniques, and/or inverse reinforcement learning techniques, etc.

As shown in box 124, after switching the planner of the simulated agent 110, the simulated vehicle 108 and the simulated agent 110 pass each other as they proceed through the intersection. At this point during the simulation, the simulated vehicle 108 proceeds along its trajectory and performs a left turn at the intersection. The simulated agent 110, now being controlled using a machine-learned planner, determines an updated trajectory 126 that reacts realistically to the scenario by negotiating the driving path of the simulated vehicle 108 and then continuing through the intersection.

In some examples, the simulation system 102 may maintain mappings between each driving scenario that may cause a planner switch for a simulated agent, and the associated planner(s) that the simulated agent will be switched to when the driving scenario is detected. For instance, the simulation system 102 may maintain a one-to-one mapping between driving scenarios and corresponding machine-learned planners to be used when the driving scenarios are detected. In other examples, mappings may be one-to-many or many-to-one mappings that take into account additional factors (e.g., the simulation time, agent type, agent attributes, etc.) to determine whether or not to switch control of the simulated agent 110 to a different planner, and which machine-learned (or heuristic) planner to switch to for controlling the simulated agent 110.

As noted above, when using a heuristic planner to control the simulated agent 110 in operation 112, the controlling of the simulated agent 110 (e.g., performing navigation operations, determining trajectories, behaviors, etc.) may be executed quickly and may be resource efficient for the simulation system 102. Additionally, controlling the simulated agent 110 using a heuristic planner may provide sufficiently realistic agent behaviors in most driving situations. However, by switching to a machine-learned planner in operation 122 to control the simulated agent 110 in specific and limited driving scenarios (e.g., when a heuristic planner might not control the simulated agent 110 effectively or realistically) the simulation system 102 may leverage the advantages of both heuristic and machine-learned planners to control a simulated agent 110 in a simulation. In some implementations, the simulation system 102 may use a single planning component (e.g., a heuristic planner) as the default/baseline planner for a simulation agent 110, and then may maintain a library defining a set of specialized driving scenarios that will cause the simulation system 102 to switch the default planner to a specialized planner (e.g., a scenario-specific machine-learned planner) to handle to the specialized driving scenario.

At operation 128, the simulation system 102 may again evaluate the current state of the driving scenarios in the simulation, to determine whether the driving scenario(s) that caused the switch of the simulated agent 110 to the machine-learned planner are ongoing or whether the scenario(s) have ended. In some examples, operation 128 may be similar or identical to operation 120. For instance, the simulation system 102 may determine the end of a driving scenario, by comparing the same conditions and/or criteria defining the existence of the driving scenario to the current state of the driving simulation and/or the simulated agent 110. Additionally or alternatively, in operation 128, the simulation system 102 may determine whether a particular driving maneuver performed by the machine-learned planner (e.g., a merging maneuver, completion of a turn, negotiation of an intersection, completed parking, etc.) has ended.

After switching control of the simulated agent 110 to a machine-learned planner, the simulation system 102 may continue to evaluate the current state of the simulation (e.g., including the current states of the simulated agents) at periodic intervals to determine whether to continue using the machine-learned planner or to switch back to the heuristic planner. The periodic intervals for such evaluations may be periodic time intervals (e.g., 0.1 secs, 0.5 secs, etc.) and/or based on longitudinal distance intervals traveled by the simulated vehicle 108 or each simulated agent 110 (e.g., 1 meter, 5 meters, 10 meters, etc.). Each time that operation 128 is performed during a simulation, when the simulation system 102 determines that the driving scenario that caused the switch to the machine-learned planner continues (128: No), then process 100 may return to operation 122 to continue executing the simulation using the same machine-learned planner to traverse the simulated agent 110 through the driving scenario. However, when the simulation system 102 determines that the current state of the simulation indicates that the driving scenario has been completed for the simulated agent 110 (128: Yes), then process 100 may return control of the simulated agent 110 to the heuristic planner in operation 112, discussed above.

As described above, FIG. 1 depicts an example in which the simulation system 102 initially controls a simulated agent 110 (or multiple simulated agents) using a heuristic planner, and then switches control of the simulated agent(s) to a machine-learned planner in response to detecting particular driving scenarios. However, in other examples, similar techniques can be performed in which a simulated agent 110 is initially controlled using a machine-learned planner and then is switched to a heuristic planner in response to detecting a particular driving scenario.

Additionally, as noted above, the simulation system 102 may include multiple heuristic planners (e.g., using different rule sets) and/or multiple machine-learned planners (e.g., trained using different machine learning techniques). Therefore, in other examples, similar or identical techniques to those discussed above in FIG. 1 can be performed in which a simulated agent 110 is switched from being controlled by one heuristic planner to a different heuristic planner, and/or is switched from being controlled by one machine-learned planner to a different machine-learned planner, based on the current driving scenario in the simulation. In various examples, the simulation system 102 may use mappings between driving scenarios and any number of planner components for controlling the simulated agents in the simulation. Such mappings may be one-to-one mappings between specific driving scenarios and associated planners, or may be more complex mappings based on additional factors such as agent type, agent position relative to simulated vehicle, simulation time, driving environments, driving conditions, etc.

In various examples, process 100 may be performed individually for each simulated agent in a driving simulation (e.g., including simulated vehicles, simulated bicycles, simulated pedestrians, etc.), and/or may be performed collectively for groups of simulated agents (or all simulated agents) in the simulation. When performing the techniques individually, the simulation system 102 may periodically evaluate the driving simulation to detect particular driving scenarios relevant to a specific simulated agent (e.g., simulated agent 110), and may switch control of that agent to a different planner when a particular scenario affecting that agent occurs. In contrast, when performing the techniques collectively, the simulation system 102 may periodically evaluate the driving simulation as a whole to detect particular driving scenarios, without consideration as to which specific agents may be affected by the driving scenario, and may switch control of multiple agents to a different planner when a particular scenario affecting any of those agents occurs.

Process 100 also depicts an example in which the planner for a simulated agent 110 is switched in response to detecting a particular driving scenario (e.g., a deadlock negotiation, agent blockage, merging action, unprotected turn, unstructured driving or parking, etc.), after which the control of the agent is switched back to the initial planner. However, in other examples, the simulation system 102 need not automatically return to the initial planner after a driving scenario has ended and/or a driving maneuver is completed. In such examples, after switching control of a simulated agent 110 from one simulation system 102 to a new planner, the simulation system 102 may continue to control the simulated agent 110 indefinitely using the new planner (e.g., until a new driving scenario is detected that may trigger a change to a different new planner).

Figure 2:
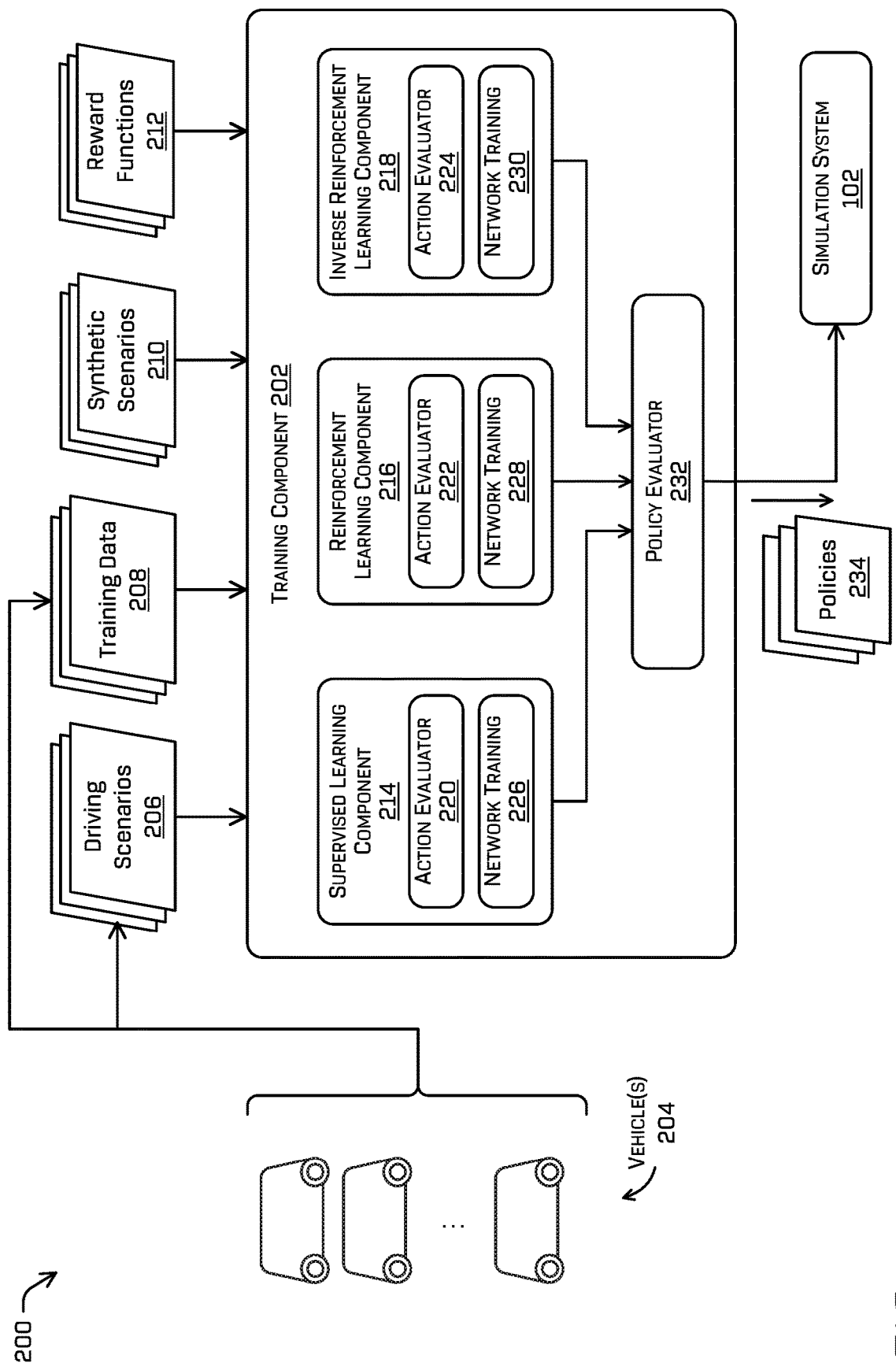
FIG. 2 illustrates a block diagram of a training component configured to train and output driving policies for various scenarios, using one or more machine learning training components, in accordance with one or more implementations of the disclosure.

FIG. 2 depicts an example system 200 including a training component 202 configured to use various machine learning techniques to train driving policies to control simulated agents in driving scenarios. As discussed below, the training component 202 may include various components to receive input data, and to train and evaluate neural networks to implement driving policies using various machine learning techniques (e.g., supervised learning, reinforcement learning, inverse reinforcement learning, etc.). As shown in this example, the training component 202 may receive data, train the neural networks to implement scenario policies, and then output the scenario policies to the simulation system 102 for use during driving simulations. However, in other implementations, the training component 202 may be incorporated as a component within the simulation system 102.

As shown in this example, the training component 202 may receive log data captured by any number of vehicles 204 associated with various driving trips and/or driving maneuvers performed by the vehicles. The log data received from vehicles 204 may include data logged (e.g., captured, calculated, processed, etc.) by sensor systems and/or other components of real or simulated vehicles 204, while operating in physical or simulated environments. The log data may include, for example, the positions, states, and trajectories followed at various points in time by the vehicle that captured the data, and/or the position/state data (e.g., x-position, y-position, velocity, yaw, steering angle, etc.) of the vehicle over a period of time in during an individual driving trip in a driving environment. The log data received from vehicles 204 also may include data observed and/or perceived by the vehicles, such as data identifying characteristics of the environment and/or other objects detected in proximity to the vehicles. For instance, for each agent detected in the environment by a vehicle 204, the log data may detect and/or determine the agent's classification, size, shape, position, location, trajectory, velocity, acceleration, jerk, and the like, at periodic time intervals (e.g., every 0.1 second, every 0.05 seconds, every second, etc.) during the driving scenario.

For certain training techniques (e.g., supervised learning, inverse reinforcement learning, etc.), the log data received from the vehicles 204 may be analyzed and grouped into corresponding driving scenarios 206, and a repository of training data 208 may be generated for each driving scenario. As described above, different driving scenarios may be defined based on different types of driving environments (e.g., city driving scenarios, highway driving scenarios, two-way or four-way stop intersection scenarios, parking lot scenarios, etc.) and/or driving situations or maneuvers (e.g., deadlock negotiations, merging, unprotected turns, parking, etc.). Additionally, different driving scenarios may be defined based on the configuration of roads in the environment, as well as the number and configuration of static and dynamic objects in the environment. As a result, each driving scenario 206 may represent a unique driving environment and/or situation defined by one or more criteria, and the training data 208 for each driving scenario may include log data representing how the vehicles 204 responded to and traversed the driving scenario.

For other training techniques (e.g., reinforcement learning, inverse reinforcement learning, etc.), the scenario policies may be trained based on synthetic scenarios 210 rather than (or in addition to) driving log data. During the training processes, the synthetic scenarios 210 may be evaluated using reward functions 212 that incentivize achieving desirable actions/states during the training process and disincentivize undesirable actions/states.

As shown in this example, the training component 202 may include machine learning components configured to train neural networks using various different training techniques, including a supervised learning component 214, a reinforcement learning component 216, and an inverse reinforcement learning component 218. In this example, each of the machine learning training components includes an action evaluator 220-224 configured to evaluate the actions of vehicles/agents during the training process, and a network training component 226-230 configured to train the neural network based on the evaluations of the vehicle/agent actions during the training process.

The training component 202 may use any number of machine learning techniques, including but not limited to the techniques described in this example, to generate machine-learned planners for controlling simulated agents. For example, supervised learning component 214 may use the training data 208 associated with various driving scenarios 206 to learn from and imitate the driving behaviors within the training data.

In contrast, the reinforcement learning component 216 may use techniques involving reinforcement learning based on log data received from vehicles 204 and/or based on synthetically simulated driving scenarios. For instance, during training of a driving policy, the reinforcement learning component 216 may execute a synthetic scenario 210 a number of times for a number of different simulated agents. During the training process, a reinforcement algorithm may be used to detect and evaluate the behaviors of the simulated agents in the environment. For example, a neural network trained using reinforcement learning may receive a top-down representation of the synthetic driving environment at a particular time, as well as the input action performed by the simulated agent at that time (e.g., an acceleration and steering rate, or a velocity and steering angle). Using the reinforcement algorithm, which may be a proximal policy optimization (PPO) algorithm or other reinforcement learning algorithm, the reinforcement learning component 216 trains a neural network as a "policy" to perform a preferred and/or optimal driving action based on the current driving environment of a simulated agent in an environment. In various examples, the actions and/or states incentivized during the training process may be based on vehicle safety, route progress, passenger comfort, law abidance, etc.

In other examples, the reinforcement learning component 216 may use driving scenarios 206 and/or training data 208 received as log data from vehicles 204. For instance, to train a driving policy based on log data from vehicles 204, the reinforcement learning component 216 may receive a driving scenario 206, replace the vehicle that captured the log data of the driving scenario with a simulated agent, and then control the simulated agent to drive in the same environment and scenarios. In such examples, the reinforcement learning algorithm may be applied to train the simulated agent to drive well and/or similar to the vehicle that captured the log data (e.g., using reward functions and/or incentives) in the same environment.

In various examples, the reinforcement learning component 216 may use sparse or dense reward functions (and/or goals) when evaluating the performance of simulated agents during training and determining desired states. For instance, using a dense reward function, the reinforcement learning component 216 may receive and aggregate feedback at frequent intervals during the training simulation, such as at processing cycles during the training simulation or frequent time intervals (e.g., every 0.1 secs, 0.5 secs, etc.). The feedback evaluated by a dense reward function may indicate the amount of progress made in the driving route, a measurement of vehicle safety, passenger comfort, etc.). In other examples, when a sparser reward function is used, the reinforcement learning component 216 might not receive feedback as frequently or evaluate the simulated vehicle state as discretely, but instead may define incentives for larger events such as vehicle crashes (e.g., a large negative incentive), acceleration (e.g., a small positive incentive), following driving laws/rules (e.g., a small positive incentive), and failing to achieve the intended destination of the simulated vehicle (e.g., a negative incentive).

Additionally, in this example, the training component 202 includes an inverse reinforcement learning component 218. The inverse reinforcement learning component 218 may use similar or identical techniques to those used by the reinforcement learning component 216, discussed above. However, in contrast to reinforcement learning, inverse reinforcement learning techniques include training simulated agents by providing goal examples of good (e.g., realistic) driving, from log data and/or synthetic simulations, and using inverse reinforcement learning to derive a policy based on the goal examples provided.

The supervised learning component 214, reinforcement learning component 216, and the inverse reinforcement learning component 218 each may be configured to train neural networks representing driving policies that can be used by planners to control simulated agents during driving simulations. As described herein, a policy may refer to a trained neural network configured to receive an input state of a vehicle in a driving environment (e.g., including a current vehicle state, driving environment, and/or the positions and attributes of other agents in the environment) and to output a driving action for the vehicle to perform based on the input state. The driving action output by a policy may be, for example, a single driving action for the vehicle to perform (e.g., a position change, yaw change, velocity change, acceleration change, steering angle change, etc.), or may be a trajectory for the vehicle to follow over a longer time and/or distance in the environment. In some examples, the driving policies trained by the training component 202 (and the corresponding planners) may be trained to control particular simulated agents (e.g., based on agent type, size, driving environment, etc.) within specific driving scenarios, such as the scenarios used to train the policy. In other examples, driving policies trained by the training component 202 (and the corresponding planners) may be trained for general-purpose driving and need not be trained for specific driving scenarios.

In this example, the training component 202 also includes a policy evaluator 232 configured to analyze, evaluate, and/or compare the driving policies trained by the supervised learning component 214, reinforcement learning component 216, and the inverse reinforcement learning component 218. In some instances, the policy evaluator 232 may compare the performance of the different trained driving policies to determine which policies may be most effective and/or most realistic. The comparisons between different trained driving policies can be performed for specific driving scenarios or for general-purpose driving. As an example, the policy evaluator 232 may run simulations of a particular driving scenario (e.g., deadlock negotiation, merging, unprotected turns, parking, unstructured driving, etc.) using each of the separate driving policies trained by the supervised learning component 214, reinforcement learning component 216, and the inverse reinforcement learning component 218. Based on evaluations of the simulations, the policy evaluator 232 may determine which machine-learned planner (e.g., a supervised learning planner, a reinforcement learning planner, or an inverse reinforcement learning planner, etc.) may perform best for the particular driving scenario. In this example, the policy evaluator 232 may output the optimal policy for any number of different driving scenarios, to allow the simulation system 102 to determine and apply the corresponding machine-learned planner associated with each driving scenario.

After receiving and/or evaluating the policies generated using the various machine learning techniques, the training component 202 may output one or more driving policies 234 to the simulation system 102. As noted above, the driving policies 234 determined using the various machine learning techniques can include policies trained for specific driving scenarios and/or policies trained for general-purpose driving.

Figure 3:
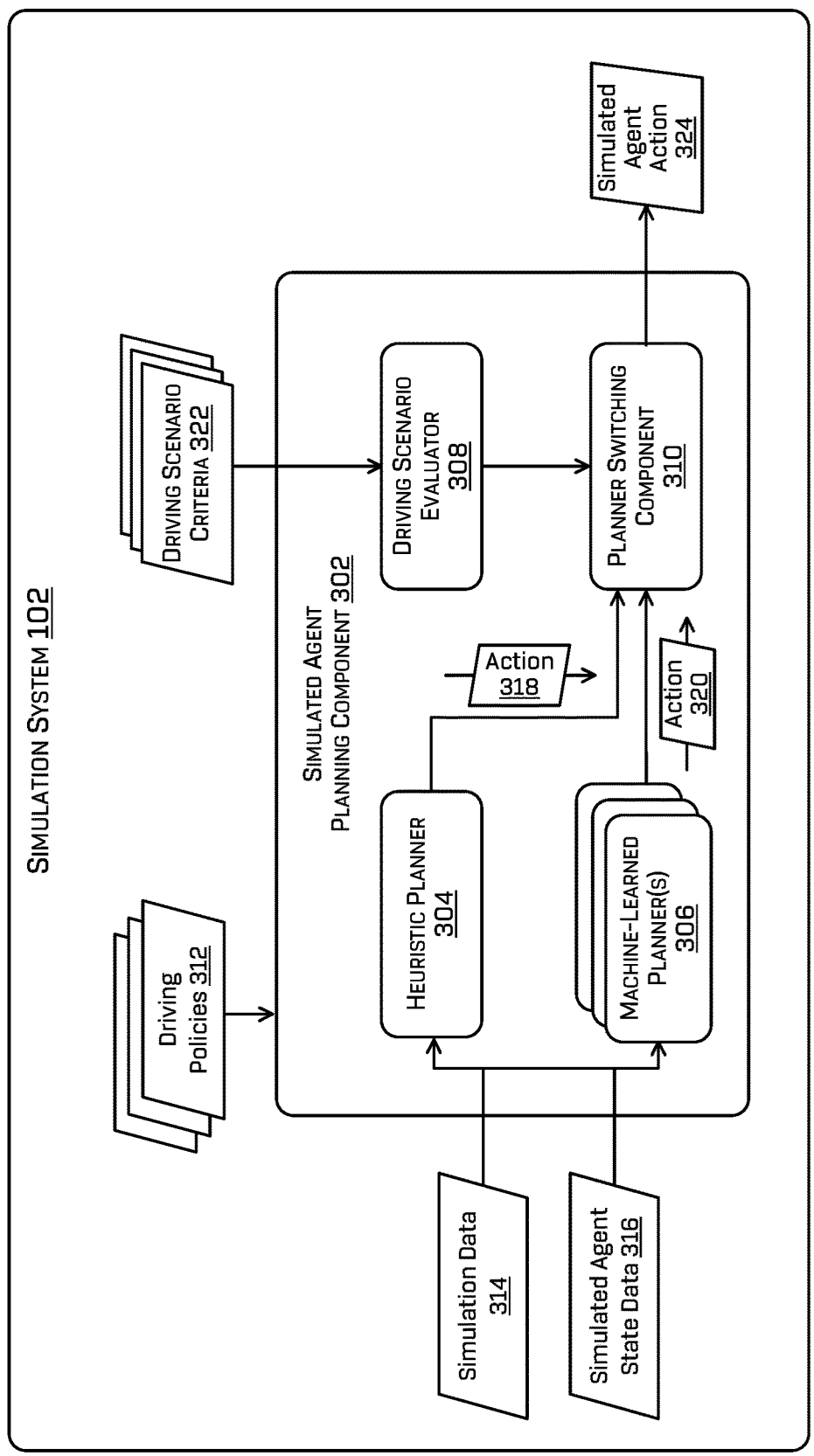
FIG. 3 illustrates a block diagram of a simulation system configured to control a programmatic agent using multiple planner components, based on the driving scenario, in accordance with one or more implementations of the disclosure.

FIG. 3 depicts an example system diagram for a simulation system 102. As discussed above, the simulation system 102 may be configured to use object controllers to control simulated agents during driving simulations. In this example, the simulated agent planner 302 may be configured as an object controller to control a simulated agent. As described below in more detail, the simulated agent planner 302 may be configured to switch control of a simulated agent between different planners (e.g., a heuristic panner and a machine-learned planner) during the simulation, based on the current driving scenario in the simulation. In some implementations, the simulation system 102 may include a single simulated agent planner 302 that is configured to determine the optimal planners and perform the planner switching for any number of simulated agents in the simulation. In other implementations, the simulation system 102 may instantiate multiple simulated agent planners during a simulation, for instance, a different simulated agent planner 302 to control each simulated agent.

As shown in this example, the simulated agent planner 302 includes one heuristic planner 304 and one or more machine-learned planners 306. As discussed above, in some examples the simulated agent planner 302 may switch control of a simulated agent between two different planners. However, in other examples, the simulated agent planner 302 may include any number of heuristic planners 304 and any number of machine-learned planners 306. In this example, each of machine-learned planners 306 implemented in the simulated agent planner 302 may be based on driving policies 312 received from the training component 202. When multiple machine-learned planners 306 are implemented in the simulated agent planner 302, the planners may represent, for example, machine-learned planners trained using different machine learning techniques (e.g., supervised learning, reinforcement learning, inverse reinforcement learning, etc.) and/or machine-learned planners trained for different specific driving scenarios.

In some examples, both the heuristic planner 304 and the machine-learned planner(s) 306 may execute continuously during the driving simulation. For instance, at each periodic time interval and/or processing cycle during the simulation, both the heuristic planner 304 and the machine-learned planner(s) 306 may analyze the simulation data 314 and simulated agent state data 316, and may output one or more actions for the simulated agent to perform at that time in the simulation. The simulation data 314 may include, for example, a top-down representation and/or encoding of the simulated environment, including the road network of the simulation, the positions and states of all other simulated vehicles, agents, and static objects, etc.). The simulated agent state data 316 may include data relating to the specific simulated agent being controlled by the simulated agent planner 302, including the current state of the simulated agent (e.g., position, pose, velocity, acceleration, steering angle, etc.), as well as the intended destination (e.g., trajectory, driving route, or goal state) and any other attributes of the simulated agent.

The actions output by the heuristic planner 304 and the machine-learned planner(s) 306, depicted as actions 318 and 320, respectively, may include specific movement instructions for the simulated agent at the particular time, such as a pair of acceleration and steering rate values, or a pair of velocity and steering angle values, etc. In other examples, the actions 318 and 320 output by the heuristic planner 304 and machine-learned planner(s) 306 may include trajectories for the simulated agent to follow and/or other behaviors to be performed by the simulated agent. Because each heuristic planner 304 and each machine-learned planner(s) 306 is implemented and/or trained differently from the other planners, the actions output by any number of heuristic and/or machine-learned planners may be different.

The driving scenario evaluator 308 and the planner switching component 310 may be used in combination to determine which of the planner outputs (e.g., action 318 or action 320) should be used to control the simulated agent. In this example, the driving scenario evaluator 308 may be configured to continuously evaluate the current state of the driving simulation, and to determine whether the current simulation state corresponds to one or more of the predetermined driving scenarios that may trigger a change in the planner used to control the simulated agents. The simulation system 102 may store driving scenario criteria 322 defining the specific states and/or conditions in a driving simulation that represent one of the predetermined driving scenarios (e.g., deadlock negotiations, agent blockages, merging actions, unprotected turns, unstructured driving or parking, etc.).

When the driving scenario evaluator 308 determines that a driving scenario has been encountered in the simulation (e.g., either for the simulation in general, or with respect to the specific simulated agent controlled by the simulated agent planner 302), the planner switching component 310 may determine and perform the appropriate switch of control of the simulated agent 110 between the heuristic and machine-learned planners. For instance, the planner switching component 310 may include mappings between different driving scenario criteria 322 and associated planners. The planner switching component 310 also may contain additional logical processes to control the planner switching, such as whether or not to switch back to a previous planner at the end of a driving scenario, rules prohibiting switching too frequently (e.g., jitter), etc. To perform planner switches (and/or to maintain control by the existing planner) for a simulated agent, the planner switching component 310 may determine the selected planner and may allow the output actions from the selected planner to pass through as the output simulated agent action 324, while discarding the actions from the remaining (non-selected) planners.

Figure 4A:
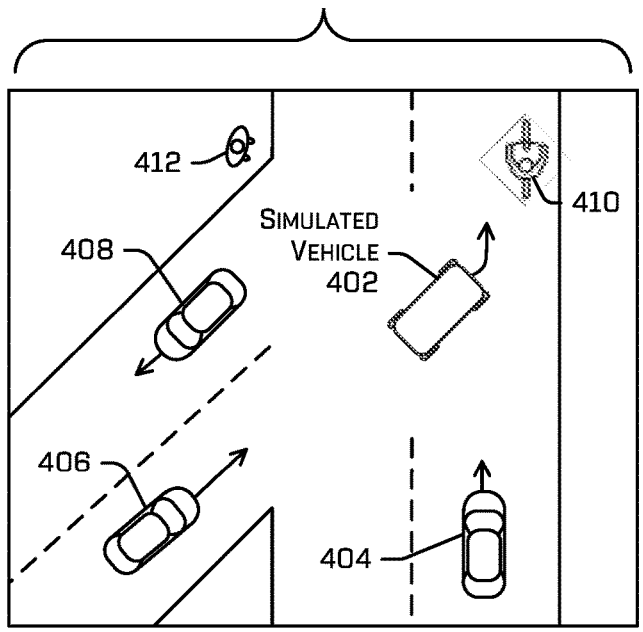
FIGS. 4A-4B illustrate example technique for control programmatic agents in a driving simulation using multiple planner components, based on detecting a driving scenario, in accordance with one or more implementations of the disclosure.
Figure 4A:
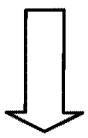
Figure 4A:
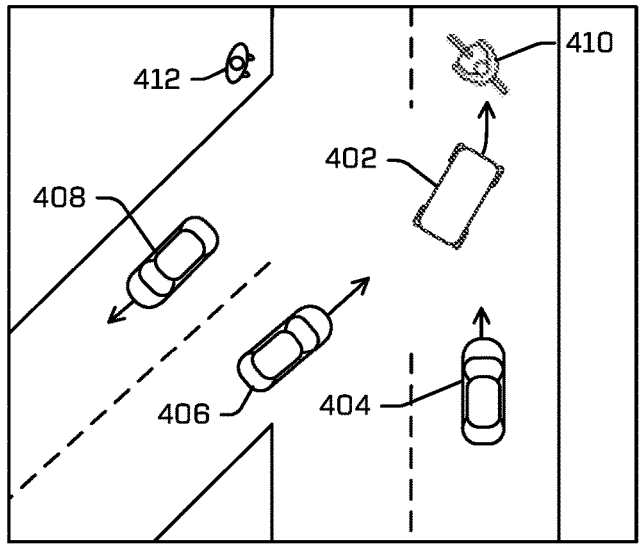
Figure 4A:
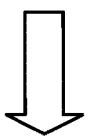
Figure 4B:
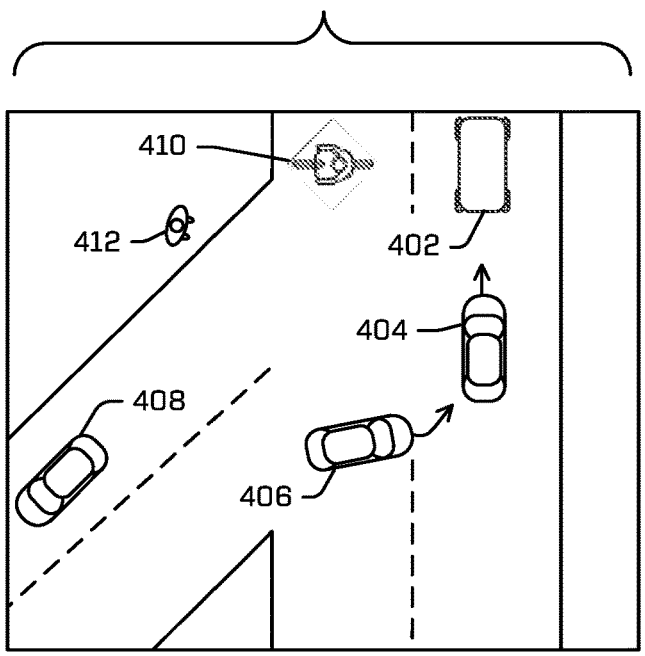
Figure 4B:
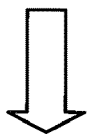
Figure 4B:
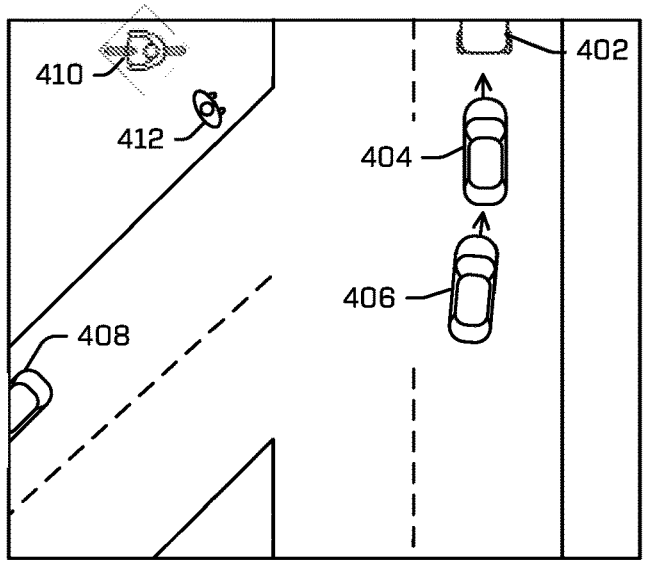

FIGS. 4A and 4B depict an example of performing a driving simulation in which a simulation system 102 is configured to switch planner components for the various programmatic agents during the simulation. In this example, a simulated driving environment 400 is shown at four different points in time during the simulation. The simulation includes a simulated vehicle 402 and five additional simulated agents 404-412. As described above, the simulated vehicle 402 may be controlled by one or more vehicle control systems, and the simulation may be executed in order to evaluate the vehicle control systems based on the actions of the simulated vehicle 402 The five additional simulated agents 404-412 may be instantiated and controlled by the simulation system 102, to provide a valuable and realistic driving simulation for the simulated vehicle 402. In this example, the driving simulation may be based on a previous driving log, and at the beginning of the simulation some or all of the simulated agents 404-412 may be playback agents that are controlled based on the previous log data. However, during the simulation, some or all of the playback agents may be converted to programmatic agents controlled by a planner component (e.g., a heuristic or machine-learned planner). Additional techniques and features for converting playback agents to programmatic (or smart) agents during a log-based simulation are described in U.S. patent application Ser. No. 17/184,128, filed Feb. 24, 2021 and entitled "Agent Conversions in Driving Simulations," and in U.S. patent application Ser. No. 17/184,169, filed Feb. 24, 2021 and entitled "Simulating Agents based on Driving Log Data," the entire contents of which are incorporated herein by reference for all purposes. In such examples, when converting a simulated agent from a playback agent to a programmatic agent, the simulation system 102 may initially select a default/baseline planner to control the programmatic agent (e.g., a heuristic agent), after which the agent may be switched between various heuristic and/or machine-learned planners using the techniques described herein. In other examples, a playback agent may be converted to a programmatic agent in response to detecting a particular driving scenario, and the conversion may be made directly to the particular planner type (e.g., a machine-learned planner) determined based on the driving scenario.

As shown in FIG. 4A, at the simulation time (T=0) in the simulated driving environment 400, the simulated vehicle agent 404 is controlled as a playback agent, the simulated vehicle agent 406 is controlled by a heuristic planner, the simulated vehicle agent 408 is controlled as a playback agent, the simulated bicycle agent 410 is controlled as a playback agent, and the simulated pedestrian agent 412 is controlled as a playback agent.

In the simulated driving environment 400, at the simulation time (T=1), the simulation system 102 has switched the simulated vehicle agent 404 from being controlled as a playback agent to being controlled by a machine-learned planner, and has switched the simulated vehicle agent 406 from being controlled by a heuristic planner to being controlled by a machine-learned planner. In this example, the planner switches for the simulated vehicle agent 404 and the simulated vehicle agent 406 may be triggered at simulation time (T=1) by the driving scenarios detected at that time in the simulation. For instance, as shown at simulation time (T=1), the simulated vehicle 402 may brake to avoid the change in direction of the simulated bicycle agent 410. Due to the braking of the simulated vehicle 402 and/or based on determining that the trajectories for the simulated vehicle agents 404 and 406 may intersect during the upcoming road merging, the simulation system 102 may switch the control of the simulated vehicle agent 404 and simulated vehicle agent 406 to machine-learned planners.

As shown in FIG. 4B, at the simulation time (T=2) in the simulated driving environment 400, the simulation system 102 has continued to control the simulated vehicle agents 404 and 406 using a machine-learned planner, which has performed a merging maneuver involving the agents and negotiated the Y-shaped intersection. Then, at the simulation time (T=3), the simulation system 102 has switched the simulated vehicle agents 404 and 406 from being controlled by a machine-learned planner to being controlled by a heuristic planner. In this example, the planner switches for the simulated vehicle agents 404 and 406 may be triggered at simulation time (T=3), in response to the simulation system 102 determining that the driving scenarios previously detected at simulation time (T=1) have passed and that both agents have completed maneuvers to move back into normal lane-following driving conditions. Therefore, the simulation system 102 may determine that a heuristic planner may provide sufficiently realistic behavior for the simulated vehicle agents 404 and 406 at simulation time (T=3), and that the more resource-expensive (and/or less predictable) machine-learned planner is not necessary at this point in the simulation.

Figure 5A:
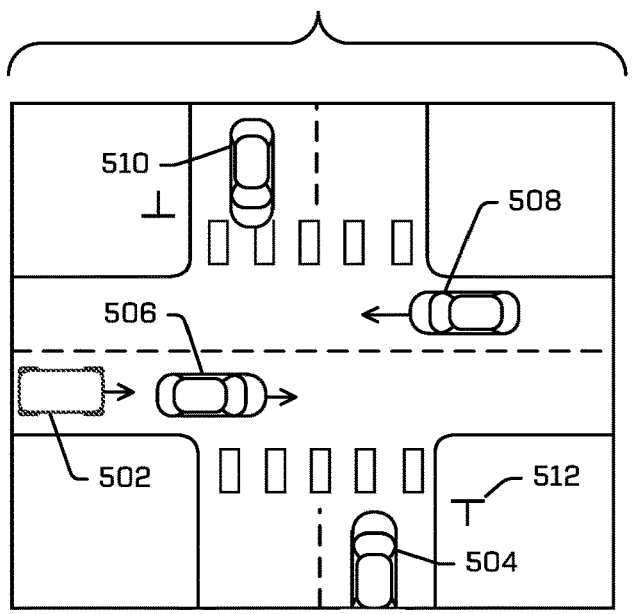
FIGS. 5A-5B illustrate additional example techniques for control programmatic agents in a driving simulation using multiple planner components, based on detecting a driving scenario, in accordance with one or more implementations of the disclosure.
Figure 5A:
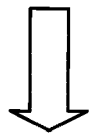
Figure 5A:
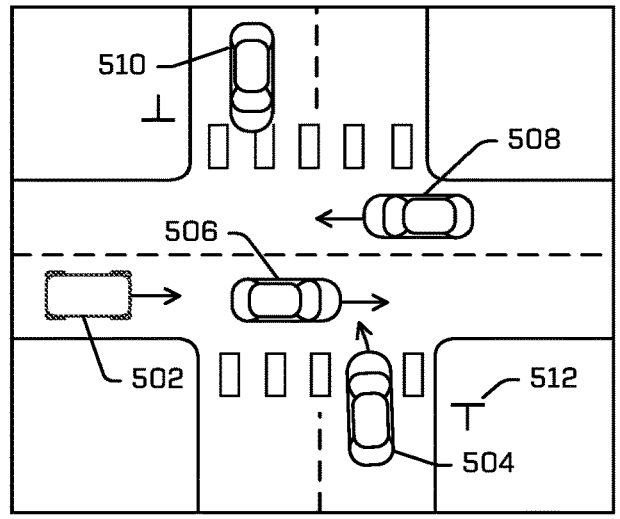
Figure 5A:
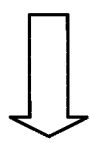
Figure 5B:
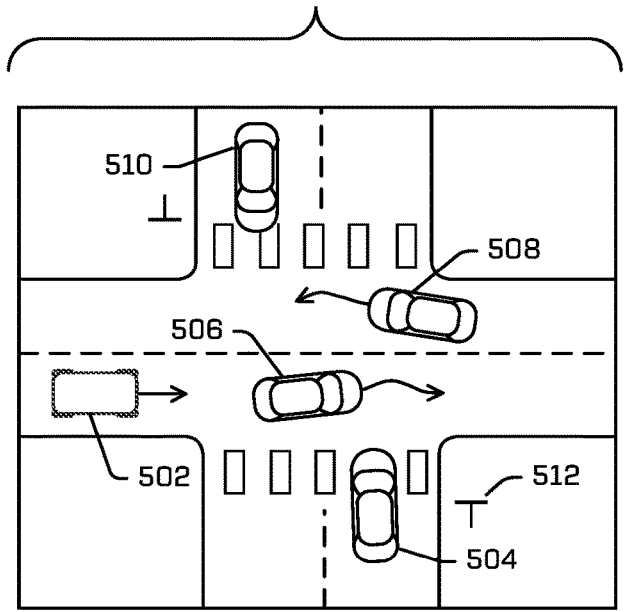
Figure 5B:
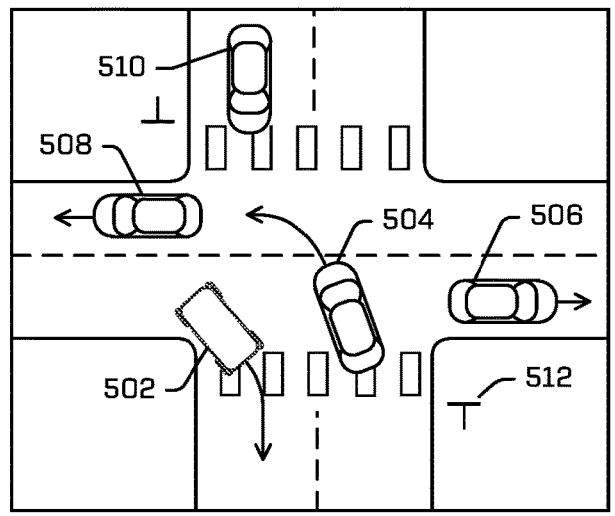

FIGS. 5A and 5B depict another example of performing a driving simulation in which a simulation system 102 is configured to switch planner components for the various programmatic agents. In this example, another simulated driving environment 500 is shown at four different points in time during the simulation. The simulation in this example includes a simulated vehicle 502 and four additional simulated agents 504-510. As described above, the simulated vehicle 502 may be controlled by one or more vehicle control systems, and the additional simulated agents 504-510 may be instantiated and controlled by the simulation system 102 using one or more simulated agent planning system components 302 (and/or other object controllers), to provide a valuable and realistic driving simulation for the simulated vehicle 502. Unlike the previous example, the driving simulation shown in FIGS. 5A and 5B may be a synthetic simulation that is not based on a previous driving log. In this example, at the beginning of the synthetic simulation, some or all of the simulated agents 404-410 may initially be controlled using a heuristic planner.

As shown in FIG. 5A, at the simulation time (T=0) in the simulated driving environment 500, each of the four simulated vehicle agents 504-510 is controlled by a heuristic planner. In the simulated driving environment 500, at the simulation time (T=1), the simulation system 102 has switched the simulated vehicle agent 504 from being controlled by a heuristic planner to being controlled by a machine-learned planner (e.g., a reinforcement learning agent). In this example, the planner switch for the simulated vehicle agent 504 may be triggered at simulation time (T=1) by a driving scenario detected by the simulation system 102. For instance, the simulation system 102 may evaluate the simulated driving environment 500 at the simulation time (T=1), and may determine that the simulated vehicle agent 504 is approaching an intersection with a stop sign 512, and intends to perform an unprotected left turn in a high-traffic environment. As described above, machine-learned planners may provide more flexibility and realistic driving behavior in complex environments. Therefore, in response to detecting the driving scenario, the simulation system 102 may select a policy and/or planner trained using reinforcement learning techniques to control the simulated vehicle agent 504 through the intersection.

As shown in FIG. 5B, at the simulation time (T=2) in the simulated driving environment 500, the simulation system 102 has continued to control the simulated vehicle agent 504 using a reinforcement learning machine-learned planner. The simulated vehicle agent 504 is shown at simulation time (T=2) having performed a slow rollout into the crosswalk to prepare to perform an unprotected left turn. Based on this driving maneuver, the simulation system 102 has also switched the control of simulated vehicle agent 506 and simulated vehicle agent 508 to machine-learned planners. In this case, based on the driving scenario currently encountered by the simulated vehicle agent 506 (e.g., the detection of the rollout performed by the simulated vehicle agent 504), the simulation system 102 has selected a machine-learned planner following a supervised learning policy to navigate the scenario. Additionally, based on the driving scenario currently encountered by the simulated vehicle agent 508 (e.g., the detection of the change in trajectory by the simulated vehicle agent 506), the simulation system 102 has selected another machine-learned planner following an inverse reinforcement learning policy to navigate the scenario.

As shown in FIG. 5B, at the simulation time (T=3) in the simulated driving environment 500, the simulation system 102 has continued to control the simulated vehicle agent 504 using the same machine-learned planner, as it pauses for a break in traffic and then performs the unprotected left turn. However, at this time in the simulated driving environment 500, the simulation system 102 has switched the simulated vehicle agents 506 and 508 from being controlled by machine-learned planners back to being controlled by heuristic planners. In this example, the planner switches for the simulated vehicle agents 506 and 508 may be triggered at simulation time (T=3), in response to the simulation system 102 determining that the driving scenarios previously detected for those vehicles at or around simulation time (T=2) have passed and that both agents have completed maneuvers to move back into normal lane-following driving conditions. Therefore, the simulation system 102 may determine that a heuristic planner may provide sufficiently realistic behavior for the simulated vehicle agents 506 and 508 at simulation time (T=3), and that the more resource-expensive (and/or less predictable) machine-learned planner is not necessary at this point in the simulation.

As shown in these examples, the simulation system 102 may use simulated agent planner(s) 302 and/or other object controllers to switch control of the simulated agents between any number of heuristic and machine-learned planners following any number of rules-based driving algorithms (for the heuristic planners) and/or any number of trained driving policies (for the machine-learned planners). Thus, the simulation system 102 may leverage the advantages of both heuristic and machine-learned planners for individual agents and/or during individual simulations, effectively creating hybrid simulated agents that use heuristic planning at some times and machine-learned planning at other times during a simulation. Thus, the simulated agents described in these examples provide the simulation system 102 with the advantages of speed and efficiency while using heuristic planners, but can be switched and controlled by machine-learned planners (and switched back) when needed to provide improved realistic behaviors and the ability to handle more complex driving situations.

Figure 6:
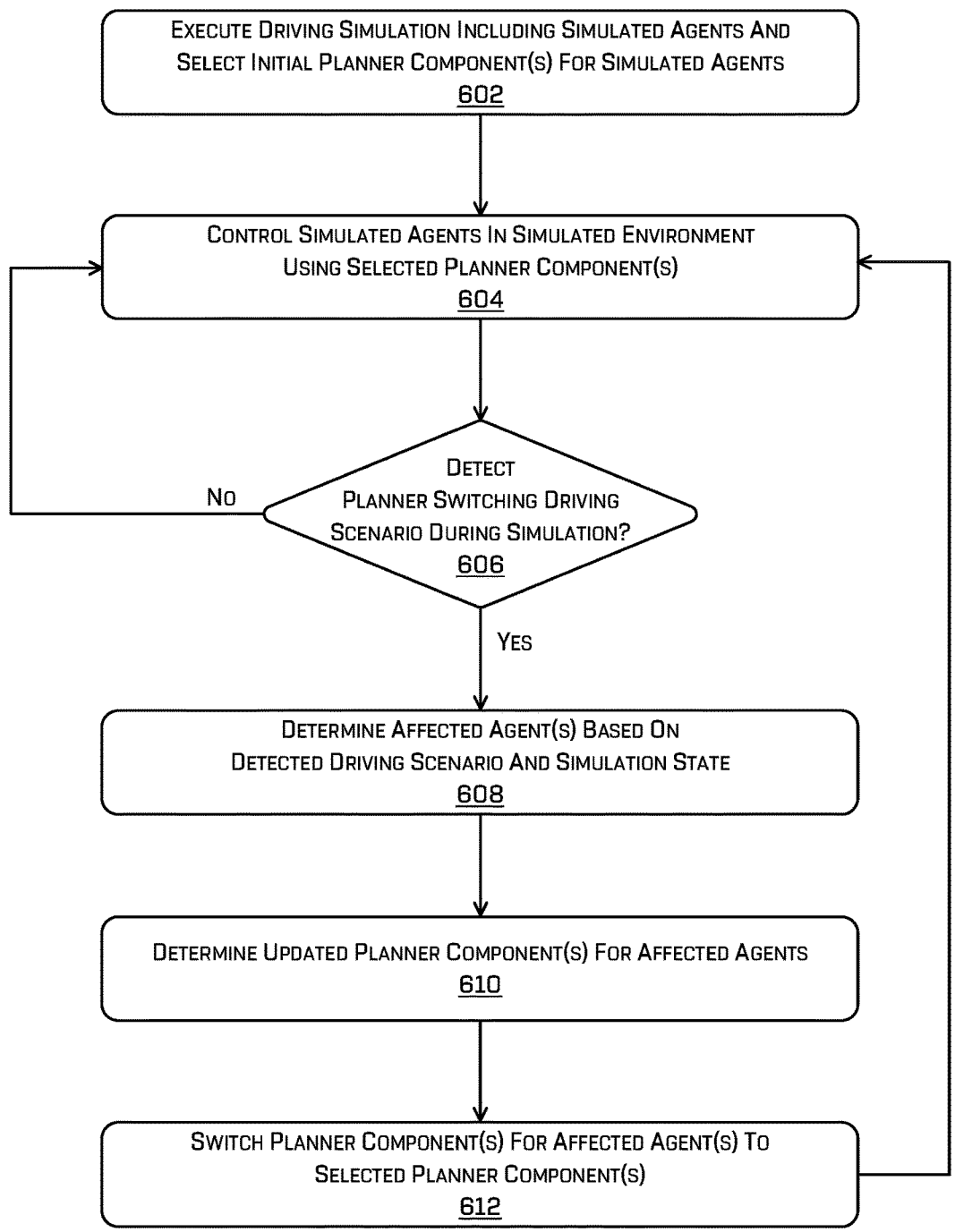
FIG. 6 is a flow diagram illustrating an example process for using different planner components to control a programmatic agent in a driving simulation, in accordance with one or more implementations of the disclosure.

FIG. 6 is a flow diagram illustrating an example process 600 of executing a driving simulation including switching between different planner components to control the programmatic agents in the simulation. In various examples, the operations of process 600 may be performed by one or more components of a simulation system 102, as described above in reference to FIGS. 1-5. One or more operations also be performed by or in conjunction with one or more vehicles 204 and/or training component(s) 202.

At operation 602, the simulation system 102 may execute a driving simulation including one or more simulated agents controlled programmatically using planning component(s). As described above, to execute the driving simulation, the simulation system 102 may generate a simulated driving environment (e.g., based on log data and/or a synthetic simulation), and may instantiate a simulated vehicle controlled by one or more vehicle control systems, and various additional simulated agents and simulated static objects within the environment. Additionally, in operation 602, the simulation system 102 may determine the planner(s) that will be used to initially control the simulated agents during the simulation. In some examples, the simulation system 102 may initially control simulated agents using a heuristic planner.

At operation 604, the simulation system 102 may control the simulated agents for a period of time during the simulation using the selected planner. In some examples, the simulation system 102 may continue to control the various simulated agents (e.g., vehicle agents, bicycle agents, pedestrian agents, etc.) using the initial planner indefinitely during the simulation, until a driving scenario is encountered that causes the simulation system 102 to switch control of one or more of the simulated agents to one or more different planners.

At operation 606, the simulation system 102 may periodically evaluate the current state of the simulation to determine whether a driving scenario has been encountered that may trigger a planner switch for one or more simulated agents. The evaluation of the current simulation state in operation 606 may include individually evaluating the simulation from the perspective of each simulated agent. For instance, the simulation system 102 may determine, for each simulated agent, the presence of one or more triggering driving situations (e.g., deadlock negotiation, blockage, etc.), the current collision risk level of the simulation for the agent, the complexity of the current or potential driving situations to be encountered by the agent, and/or types of driving maneuvers that the agent is likely to perform as the simulation progresses (e.g., lane changing, merging in traffic, parking, unprotected turns, etc.). Additionally or alternatively, the simulation system 102 may evaluate the current state of the driving simulation as a whole, collectively for groups of simulated agents and/or for all vehicles/agents in the simulation.

During the simulation, when the simulation system 102 does not detect a driving scenario to trigger switching control of any simulated agents to a different planner (606: No), then process 600 may return to operation 604 to continue execution of the simulation. However, as described above, when the simulation system 102 detects a specific driving scenario that may trigger a switch between planners for one or more of the simulated agents (606: Yes), then process 600 may proceed to operation 608.

At operation 608, the simulation system 102 may determine which simulated agents are associated with the driving scenario detected in operation 606. As described above, in some examples, the simulation system 102 may include a driving scenario evaluator 308 configured to evaluate the current state of the driving simulation. The driving scenario evaluator 308 may compare the current simulation state (e.g., current driving environment including the number and configuration of simulated objects and agents, the current states of the simulated vehicle and simulated agents including planned trajectories, etc.) to the criteria defining one or more of the predetermined driving scenarios that may trigger a change in the planner used to control the simulated agents. Certain driving scenarios that may occur during a simulation may apply to a single simulated agent only, whereas other driving scenarios may apply to multiple simulated agents (e.g., a pair of agents in a deadlock negotiation). In other examples, the simulation system 102 may determine that the driving scenario should cause the planner to be switched (e.g., from heuristic to machine-learned) for all of the simulated agents in the simulation.

At operation 610, the simulation system 102 may determine the updated planner component(s) for each of the affected simulated agents. As described above, in some examples, the simulation system 102 may include a planner switching component 310 configured to select, based on the detection of one or more driving scenarios, the new planners to be used to control the affected simulated agents. For instance, the planner switching component 310 may select a machine-learned planner to control a simulated agent, based on determining that the simulated agent is currently controlled by a heuristic planner and that the simulated agent has encountered a particular driving scenario (e.g., deadlock negotiation, blockage, unprotected turn, merging, etc.). As another example, if in operation 610, the planner switching component 310 determines that the simulated agent is currently controlled by a machine-learned planner and that the particular driving scenario (e.g., deadlock negotiation, blockage, unprotected turn, merging, etc.) no longer applies to the simulated agent, then the planner switching component 310 may select a heuristic planner to control the simulated agent.

As described above, the planner switching component 310 may select different planners for the simulated agent based on encountering different driving scenarios. For instance, the planner switching component 310 may use mappings in operation 610 that map combinations of current planners and driving scenarios to the corresponding new planner(s) that the simulated agent will be switched to when the driving scenarios are detected. Such mappings can include one-to-one mappings between driving scenarios and corresponding heuristic or machine-learned planners, and/or may include one-to-many or many-to-one mappings that determine the planner to switch to based on additional factors as well, such as simulation time, agent type, agent attributes, etc.

At operation 612, the simulation system 102 may switch the planner(s) of the affected simulated agents to the updated planners determined in operation 610. In some examples, to perform a switch between an existing planner and a new planner for a simulated agent, the planner switching component 310 may determine the selected planner and may allow the output actions from the selected planner to pass through as the output simulated agent action 324 for the simulated agent, while discarding the actions from the remaining (non-selected) planners.

Figure 7:
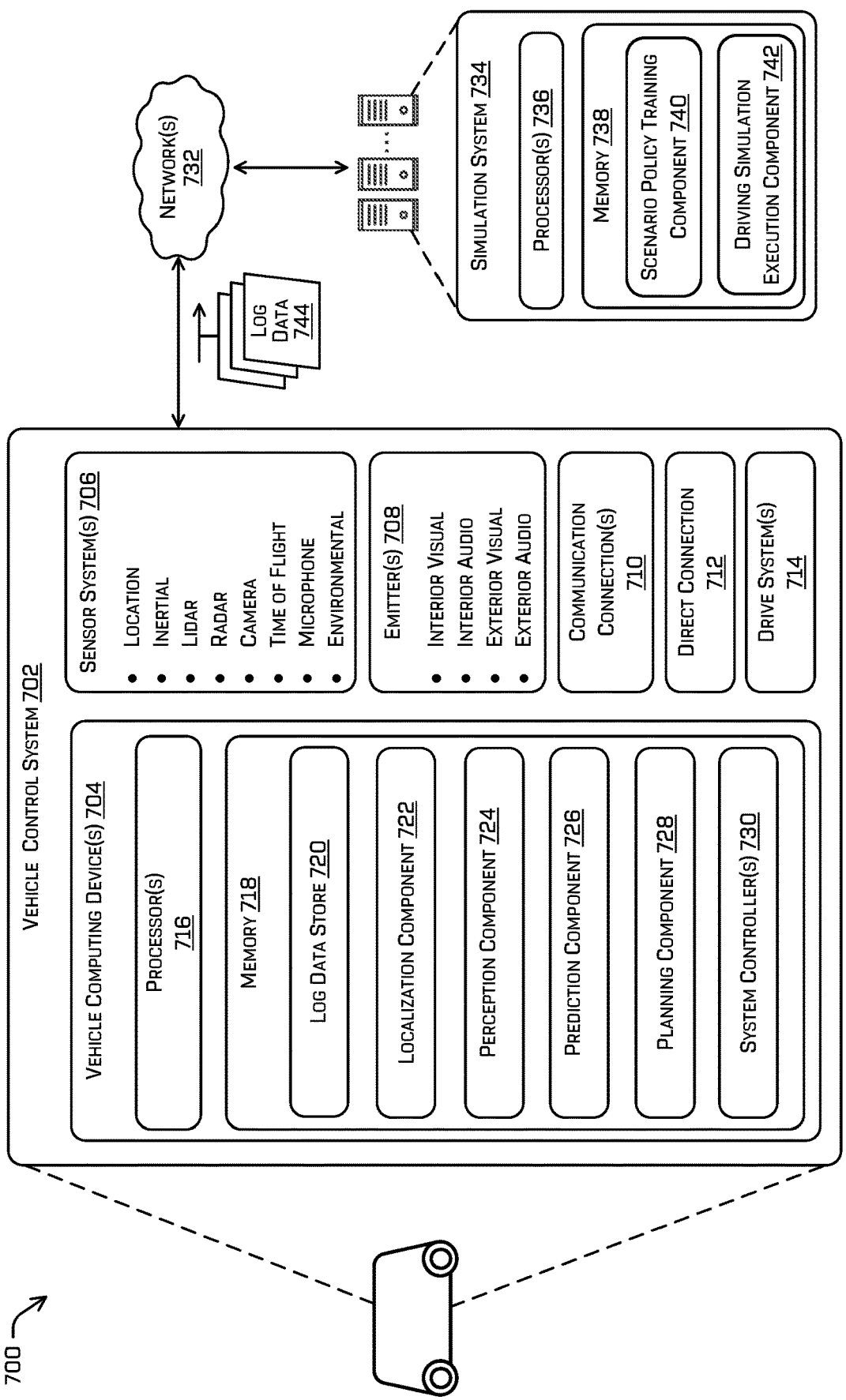
FIG. 7 includes a block diagram of an example architecture of a vehicle control system and a simulation system for performing driving simulations, in accordance with one or more examples of the disclosure.

FIG. 7 illustrates an example computing environment 700 that may be used to implement the driving simulation systems according to the techniques described herein. The computing environment 700 may include a vehicle control system 702 and one or more computing device(s) configured to implement a simulation system 734. The vehicle control system 702 may include various software-based and/or hardware-based components of an autonomous vehicle, and may be used to control autonomous vehicles traversing through physical environments and/or simulated vehicles operating within virtual and/or log-based simulations.

In this example, the vehicle control system 702 and the simulation system 734 are illustrated as discrete computing systems communicating over one or more networks 732, although in other implementations the functionality of each of the systems 702 and 734, may be carried out in the same computing environment. By way of non-limiting example, software executing the functionality of the vehicle control system 702 may be uploaded or otherwise incorporated into the simulation system 734 and/or software executing the computing device(s) of the simulation system 734 may be uploaded to or otherwise made incorporated into the vehicle control system 702.

The vehicle control system 702 can be a hardware-based and/or software-based controller for a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In some instances, the vehicle control system 702 may operate within a real associated vehicle, such as a fully or partially autonomous vehicle having any other level or classification. In some instances, the techniques described herein may be usable by non-autonomous vehicles as well. Additionally or alternatively, the vehicle control system 702 may operate independently from any vehicle, for example, as a hardware and/or software-based controller for a simulated vehicle executing in a computing environment during the development, testing, and validation processes for the vehicle control system 702. In addition, while implementations of the vehicle control system 702 described herein may include simulating a control system of an autonomous vehicle, semi-autonomous vehicle, or a non-autonomous vehicle, some of the techniques may be in a simulated environment, using a simulated vehicle.

The vehicle control system 702 can be used for any configuration of real or simulated vehicles, such as, for example, a van, a sport utility vehicle, a cross-over vehicle, a truck, a bus, an agricultural vehicle, and/or a construction vehicle. For instance, the associated vehicle for the vehicle control system 702 can be powered by one or more internal combustion engines, one or more electric motors, hydrogen power, any combination thereof, and/or any other suitable power sources. Although the associated vehicle may have four wheels, the vehicle control system 702 and associated techniques described herein can be incorporated into vehicles having fewer or a greater number of wheels, and/or tires. The vehicle control system 702 can control vehicles having four-wheel steering and can operate generally with equal or similar performance characteristics in all directions, for example, such that a first end of the vehicle is the front end of the vehicle when traveling in a first direction, and such that the first end becomes the rear end of the vehicle when traveling in the opposite direction. Similarly, a second end of the vehicle is the front end of the vehicle when traveling in the second direction, and such that the second end becomes the rear end of the vehicle when traveling in the opposite direction. These example characteristics may facilitate greater maneuverability, for example, in small spaces or crowded environments, such as parking lots and/or urban areas.

The vehicle control system 702 can include a computing device(s) 704, one or more sensor system(s) 706, one or more emitter(s) 708, one or more communication connection(s) 710 (also referred to as communication devices and/or modems), at least one direct connection 712 (e.g., for physically coupling with the vehicle to exchange data and/or to provide power), and one or more drive system(s) 714. The one or more sensor system(s) 706 can be configured to capture sensor data associated with an environment.

The sensor system(s) 706 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 706 can include multiple instances of each of these or other types of sensors. For instance, the time-of-flight sensors can include individual time-of-flight sensors located at the corners, front, back, sides, and/or top of the real or simulated vehicle associated with the vehicle control system 702. As another example, the camera sensors can include multiple cameras disposed at various locations about the exterior and/or interior of the associated real or simulated vehicle. The sensor system(s) 706 can provide input to the computing device(s) 704.

The vehicle control system 702 can also include one or more emitter(s) 708 for controller the emitting of light and/or sound via the real or simulated vehicle associated with the vehicle control system 702. The one or more emitter(s) 708 in this example include interior audio and visual emitters to communicate with passengers of the vehicle. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 708 in this example also include exterior emitters. By way of example and not limitation, the exterior emitters in this example include lights to signal a direction of travel or other indicators of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle control system 702 can also include one or more communication connection(s) 710 that enable communication between the vehicle control system 702 and one or more other local or remote computing device(s) (e.g., a remote teleoperations computing device) or remote services. For instance, the communication connection(s) 710 can facilitate communication with other local computing device(s) on the associated real or simulated vehicle, and/or the drive system(s) 714. Also, the communication connection(s) 710 can allow the vehicle to communicate with other nearby computing device(s) (e.g., other nearby vehicles, traffic signals, etc.).

The communications connection(s) 710 can include physical and/or logical interfaces for connecting the computing device(s) 704 to another computing device or one or more external networks (e.g., the Internet). For example, the communications connection(s) 710 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short range communications (DSRC), or any suitable wired or wireless communications protocol that enables the respective computing device to interface with the other computing device(s). In at least some examples, the communication connection(s) 710 may comprise the one or more modems as described in detail above.

In at least one example, the vehicle control system 702 can include one or more drive system(s) 714. In some examples, the real or simulated vehicle associated with the vehicle control system 702 can have a single drive system 714. In at least one example, if the vehicle has multiple drive systems 714, individual drive systems 714 can be positioned on opposite ends of the associated vehicle (e.g., the front and the rear, etc.). In at least one example, the drive system(s) 714 can include one or more sensor system(s) 706 to detect conditions of the drive system(s) 714 and/or the surroundings of the vehicle. By way of example and not limitation, the sensor system(s) 706 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 714. In some cases, the sensor system(s) 706 on the drive system(s) 714 can overlap or supplement corresponding systems of the vehicle control system 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which can receive and preprocess data from the sensor system(s) 706 and to control operation of the various vehicle systems. In some examples, the drive system controller can include one or more processor(s) and memory communicatively coupled with the one or more processor(s). The memory can store one or more modules to perform various functionalities of the drive system(s) 714. Furthermore, the drive system(s) 714 also include one or more communication connection(s) that enable communication by the respective drive system with one or more other local or remote computing device(s).

The computing device(s) 704 within the vehicle control system 702 can include one or more processor(s) 716 and memory 718 communicatively coupled with the one or more processor(s) 716. In the illustrated example, the memory 718 of the vehicle computing device(s) 704 includes log data store 720, a localization component 722, a perception component 724, a prediction component 726, a planning component 728, and one or more system controller(s) 730. Though depicted as residing in the memory 718 for illustrative purposes, it is contemplated that the localization component 722, the perception component 724, the prediction component 726, the planning component 728, and the one or more system controller(s) 730 can additionally, or alternatively, be accessible to the computing device(s) 704 (e.g., stored in a different component of vehicle control system 702 and/or stored remotely and accessible to the vehicle control system 702.

The log data store 720 can include map data, vehicle type, software version, vehicle positions, vehicle velocities, vehicle accelerations, or the like overtime during the course of individual trips. In some examples, the log data store 720 can further include raw sensor data and/or data based on sensor data detected at the plurality of vehicles, for example, data identifying characteristics of the environment in which a vehicle was operated, objects within the proximity of the vehicle, attributes or characteristics of the environment and objects (e.g., classifications, sizes, shapes, positions, trajectories, etc.).

The localization component 722 can include functionality to receive data from the sensor system(s) 706 to determine a position of the real vehicle associated with the vehicle control system 702. For example, the localization component 722 can include and/or request/receive a three-dimensional map of the real environment and can continuously determine a location of the autonomous vehicle within the map. In some instances, the localization component 722 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle.

The perception component 724 can include functionality to perform object detection, segmentation, and/or classification. In some examples, the perception component 724 can provide processed sensor data that indicates a presence of an entity that is proximate to the real or simulated vehicle associated with the vehicle control system 702 and/or a classification of the entity as an entity type (e.g., car, pedestrian, cyclist, building, tree, road surface, curb, sidewalk, unknown, etc.). In additional and/or alternative examples, the perception component 724 can provide processed sensor data that indicates one or more characteristics associated with a detected entity and/or the real or simulated environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The prediction component 726 can receive sensor data from the sensor system(s) 706, map data, and/or perception data output from the perception component 724 (e.g., processed sensor data), and can output predictions associated with one or more objects within the environment of the autonomous vehicle. Predictions can include predicted trajectories associated with objects in the environment in which the autonomous vehicle is operating.

The planning component 728 can determine a path for the vehicle control system 702 to direct the real vehicle through a real environment. For example, the planning component 728 can determine various routes and paths and various levels of detail. In some instances, the planning component 728 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 728 can generate an instruction for guiding the autonomous vehicle along at least a portion of the route from the first location to the second location. In at least one example, the planning component 728 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 728 can alternatively, or additionally, use data from the perception component 724 to determine a path for the real vehicle associated with the vehicle control system 702 to follow to traverse through an environment. For example, the planning component 728 can receive data from the perception component 724 regarding objects associated with an environment. Using this data, the planning component 728 can determine a route to travel from a first location (e.g., a current location) to a second location (e.g., a target location) to avoid objects in an environment. In at least some examples, such a planning component 728 may determine there is no such collision free path and, in turn, provide a path which brings the vehicle to a safe stop avoiding all collisions and/or otherwise mitigating damage.

The simulation system 734 can receive log data 744 from the vehicle control system 702 and drive simulations based at least in part on the log data. Although not shown in this example, the simulation system 734 also may include log data store(s) similar or identical to the log data store 720. The simulation system 734 may include one or more processors 736 and memory 738 communicatively coupled with the one or more processors 736. In the illustrated example, the memory 738 of the simulation system 734 stores a scenario policy training component 740, which may be similar or identical to the training component 202 described above in FIG. 2, and a driving simulation execution component 742, which may be similar or identical to the simulation system 102 described above in FIGS. 1-6.

In some examples, the log data 744 can include trajectories associated with a plurality of vehicles, including real and/or simulated vehicles operating with various software versions and/or various vehicle types. To train scenario policies for a simulated agent, the scenario policy training component 740 can train to output an optimal (e.g., lowest cost) trajectory based on training data including a plurality of vehicle trajectories based on log data 744. In some examples, the scenario policy training component 740 can filter the log data 744 to train policies for a planner based on the software version and/or the vehicle type associated with simulated agent, using training data from real vehicles having the same software version and/or the same vehicle type as the simulated agent.

The driving simulation execution component 742 can control simulated agents based at least in part on the trained scenario policies generated by the scenario policy training component 740. In response to determining a particular driving scenario, the driving simulation execution component 742 may retrieve an associated heuristic algorithm and/or an associated machine-learned policy for the driving scenario, and may select programmatic planner(s) to control the simulated agents using the associated heuristic algorithm or machine-learned policy.

The processor(s) 716 of the computing device(s) 704 and the processor(s) 736 of the simulation system 734 can be any suitable processor capable of executing instructions to process data and perform operations as described herein. By way of example and not limitation, the processor(s) 716 and 736 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 718 of the computing device(s) 704, and the memory 738 of the simulation system 734 are examples of non-transitory computer-readable media. The memory 718 and 738 can store an operating system and one or more software applications, instructions, programs, and/or data to implement the methods described herein and the functions attributed to the various systems. In various implementations, the memory 718 and 738 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, any or all of the components within the memory 718 and memory 738 can be implemented as a neural network.

Example Clauses

A. A system comprising: one or more processors; and one or more non-transitory computer-readable media storing computer-executable instructions that, when executed, cause the one or more processors to perform operations comprising: executing a driving simulation, wherein the driving simulation includes a first simulated vehicle and a second simulated vehicle operating in a simulated environment; controlling the first simulated vehicle, during a first time period in the driving simulation, using a first heuristic planner component; determining, during the first time period, a potential interaction in the driving simulation between the first simulated vehicle and the second simulated vehicle; controlling the first simulated vehicle, during a second time period in the driving simulation after the first time period, using a second machine-learned planner component, wherein controlling the first simulated vehicle using the second machine-learned planner component is based at least in part on determining the potential interaction; determining, using the second machine-learned planner component, a driving maneuver for the first simulated vehicle to avoid to the potential interaction with the second simulated vehicle; determining an ending of the driving maneuver for the first simulated vehicle to avoid to the potential interaction; and controlling the first simulated vehicle using the first heuristic planner component, during a third time period in the driving simulation after the second time period, based at least in part on determining the ending of the driving maneuver.

B. The system of paragraph A, the operations further comprising: controlling the second simulated vehicle, during the second time period, using the first heuristic planner component.

C. The system of paragraph A, the operations further comprising: controlling the second simulated vehicle, during the driving simulation, based at least in part on at least one of: the first heuristic planner component; the second machine-learned planner component; or previous log data associated with a non-simulated vehicle.

D. The system of paragraph A, wherein controlling the first simulated vehicle using the second machine-learned planner component comprises: determining the second machine-learned planner component from a plurality of machine-learned planner components, based at least in part on the potential interaction, wherein the plurality of machine-learned planner components comprises at least two of: a planner component including a neural network trained using supervised learning; and a planner component including a neural network trained using reinforcement learning; and a planner component including a neural network trained using inverse reinforcement learning.

E. The system of paragraph A, wherein determining the potential interaction in the driving simulation comprises determining at least one of: a deadlock negotiation between the first simulated vehicle and the second simulated vehicle; a merging required by the first simulated vehicle into a lane associated with the second simulated vehicle; or an unprotected turn required by the first simulated vehicle onto a roadway with the second simulated vehicle.

F. A method comprising: executing a driving simulation, wherein the driving simulation includes a first simulated vehicle operating in a simulated environment; controlling the first simulated vehicle using a first heuristic planner component, during a first time period in the driving simulation; determining, during the first time period in the driving simulation, a driving scenario associated with the first simulated vehicle; and controlling the first simulated vehicle using a second machine-learned planner component, during a second time period in the driving simulation after the first time period, wherein controlling the first simulated vehicle using the second machine-learned planner component is based at least in part on determining the driving scenario.

G. The method of paragraph F, wherein determining the driving scenario comprises at least one of: determining a driving maneuver to be performed by the first simulated vehicle, based at least in part on a state of the driving simulation during the first time period; or determining an interaction between the first simulated vehicle and a second simulated vehicle in the driving simulation.

H. The method of paragraph F, further comprising: determining, during the second time period in the driving simulation, an ending of the driving scenario associated with the first simulated vehicle; and controlling the first simulated vehicle using the first heuristic planner component, during a third time period in the driving simulation after the second time period, based at least in part on determining the ending of the driving scenario.

I. The method of claim 6, wherein controlling the first simulated vehicle using the second machine-learned planner component comprises: determining the second machine-learned planner component from a plurality of machine-learned planner components, based at least in part on the driving scenario.

J. The method of paragraph I, wherein the plurality of machine-learned planner components comprises at least two of: a planner component including a neural network trained using supervised learning; a planner component including a neural network trained using reinforcement learning; and a planner component including a neural network trained using inverse reinforcement learning.

K. The method of paragraph F, wherein, at a first point in time during the driving simulation: the first simulated vehicle is controlled by the first heuristic planner component; and a second simulated vehicle is controlled by the second machine-learned planner component.

L. The method of paragraph F, wherein determining the driving scenario comprises determining an interaction in the driving simulation between the first simulated vehicle and a second simulated vehicle, the method further comprising: controlling, based at least in part on determining the interaction, the first simulated vehicle and the second simulated vehicle using the second machine-learned planner component.

M. The method of paragraph F, wherein controlling the first simulated vehicle using the second machine-learned planner component comprises: providing, to a neural network associated with the second machine-learned planner component, a representation of the driving simulation at a time during the second time period; and determining, based at least in part on an output of the neural network, a driving action for the first simulated vehicle to perform.

N. One or more non transitory computer readable media storing instructions executable by a processor, wherein the instructions, when executed, cause the processor to perform operations comprising: executing a driving simulation, wherein the driving simulation includes a first simulated vehicle operating in a simulated environment; controlling the first simulated vehicle using a first heuristic planner component, during a first time period in the driving simulation; determining, during the first time period in the driving simulation, a driving scenario associated with the first simulated vehicle; and controlling the first simulated vehicle using a second machine-learned planner component, during a second time period in the driving simulation after the first time period, wherein controlling the first simulated vehicle using the second machine-learned planner component is based at least in part on determining the driving scenario.

O. The one or more non transitory computer readable media of paragraph N, wherein determining the driving scenario comprises at least one of: determining a driving maneuver to be performed by the first simulated vehicle, based at least in part on a state of the driving simulation during the first time period; or determining an interaction between the first simulated vehicle and a second simulated vehicle in the driving simulation.

P. The one or more non transitory computer readable media of paragraph N, the operations further comprising: determining, during the second time period in the driving simulation, an ending of the driving scenario associated with the first simulated vehicle; and controlling the first simulated vehicle using the first heuristic planner component, during a third time period in the driving simulation after the second time period, based at least in part on determining the ending of the driving scenario.

Q. The one or more non transitory computer readable media of paragraph N, wherein controlling the first simulated vehicle using the second machine-learned planner component comprises: determining the second machine-learned planner component from a plurality of machine-learned planner components, based at least in part on the driving scenario.

R. The one or more non transitory computer readable media of paragraph Q, wherein the plurality of machine-learned planner components comprises at least two of: a planner component including a neural network trained using supervised learning; a planner component including a neural network trained using reinforcement learning; and a planner component including a neural network trained using inverse reinforcement learning.

S. The one or more non transitory computer readable media of paragraph N, wherein, at a first point in time during the driving simulation: the first simulated vehicle is controlled by the first heuristic planner component; and a second simulated vehicle is controlled by the second machine-learned planner component.

T. The one or more non transitory computer readable media of paragraph N, wherein determining the driving scenario comprises determining an interaction in the driving simulation between the first simulated vehicle and a second simulated vehicle, the operations further comprising: controlling, based at least in part on determining the interaction, the first simulated vehicle and the second simulated vehicle using the second machine-learned planner component.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the one or more processors to perform operations comprising:
executing a driving simulation, wherein the driving simulation includes a first simulated vehicle and a second simulated vehicle operating in a simulated environment;
controlling the first simulated vehicle, during a first time period in the driving simulation, using a first heuristic planner component;
determining, during the first time period, a potential interaction in the driving simulation between the first simulated vehicle and the second simulated vehicle;
controlling the first simulated vehicle, during a second time period in the driving simulation after the first time period, using a second machine-learned planner component, wherein controlling the first simulated vehicle using the second machine-learned planner component is based at least in part on determining the potential interaction;
determining, using the second machine-learned planner component, a driving maneuver for the first simulated vehicle to avoid to the potential interaction with the second simulated vehicle;
determining an ending of the driving maneuver for the first simulated vehicle to avoid to the potential interaction; and
controlling the first simulated vehicle using the first heuristic planner component, during a third time period in the driving simulation after the second time period, based at least in part on determining the ending of the driving maneuver.

2. The system of claim 1, the operations further comprising:
controlling the second simulated vehicle, during the second time period, using the first heuristic planner component.

3. The system of claim 1, the operations further comprising:
controlling the second simulated vehicle, during the driving simulation, based at least in part on at least one of:
the first heuristic planner component;
the second machine-learned planner component; or
previous log data associated with a non-simulated vehicle.

4. The system of claim 1, wherein controlling the first simulated vehicle using the second machine-learned planner component comprises:
determining the second machine-learned planner component from a plurality of machine-learned planner components, based at least in part on the potential interaction, wherein the plurality of machine-learned planner components comprises at least two of:

a planner component including a neural network trained using supervised learning; and
a planner component including a neural network trained using reinforcement learning; and
a planner component including a neural network trained using inverse reinforcement learning.

5. The system of claim 1, wherein determining the potential interaction in the driving simulation comprises determining at least one of:
a deadlock negotiation between the first simulated vehicle and the second simulated vehicle;
a merging required by the first simulated vehicle into a lane associated with the second simulated vehicle; or
an unprotected turn required by the first simulated vehicle onto a roadway with the second simulated vehicle.

6. A method comprising:
executing a driving simulation, wherein the driving simulation includes a first simulated vehicle operating in a simulated environment;
controlling the first simulated vehicle using a first heuristic planner component, during a first time period in the driving simulation;
determining, during the first time period in the driving simulation, a driving scenario associated with the first simulated vehicle; and
controlling the first simulated vehicle using a second machine-learned planner component, during a second time period in the driving simulation after the first time period, wherein controlling the first simulated vehicle using the second machine-learned planner component is based at least in part on determining the driving scenario.

7. The method of claim 6, wherein determining the driving scenario comprises at least one of:
determining a driving maneuver to be performed by the first simulated vehicle, based at least in part on a state of the driving simulation during the first time period; or
determining an interaction between the first simulated vehicle and a second simulated vehicle in the driving simulation.

8. The method of claim 6, further comprising:
determining, during the second time period in the driving simulation, an ending of the driving scenario associated with the first simulated vehicle; and
controlling the first simulated vehicle using the first heuristic planner component, during a third time period in the driving simulation after the second time period, based at least in part on determining the ending of the driving scenario.

9. The method of claim 6, wherein controlling the first simulated vehicle using the second machine-learned planner component comprises:
determining the second machine-learned planner component from a plurality of machine-learned planner components, based at least in part on the driving scenario.

10. The method of claim 9, wherein the plurality of machine-learned planner components comprises at least two of:
a planner component including a neural network trained using supervised learning;
a planner component including a neural network trained using reinforcement learning; and
a planner component including a neural network trained using inverse reinforcement learning.

11. The method of claim 6, wherein, at a first point in time during the driving simulation:
the first simulated vehicle is controlled by the first heuristic planner component; and
a second simulated vehicle is controlled by the second machine-learned planner component.

12. The method of claim 6, wherein determining the driving scenario comprises determining an interaction in the driving simulation between the first simulated vehicle and a second simulated vehicle, the method further comprising:
controlling, based at least in part on determining the interaction, the first simulated vehicle and the second simulated vehicle using the second machine-learned planner component.

13. The method of claim 6, wherein controlling the first simulated vehicle using the second machine-learned planner component comprises:
providing, to a neural network associated with the second machine-learned planner component, a representation of the driving simulation at a time during the second time period; and
determining, based at least in part on an output of the neural network, a driving action for the first simulated vehicle to perform.

14. One or more non-transitory computer-readable media storing instructions executable by a processor, wherein the instructions, when executed, cause the processor to perform operations comprising:
executing a driving simulation, wherein the driving simulation includes a first simulated vehicle operating in a simulated environment;
controlling the first simulated vehicle using a first heuristic planner component, during a first time period in the driving simulation;
determining, during the first time period in the driving simulation, a driving scenario associated with the first simulated vehicle; and
controlling the first simulated vehicle using a second machine-learned planner component, during a second time period in the driving simulation after the first time period, wherein controlling the first simulated vehicle using the second machine-learned planner component is based at least in part on determining the driving scenario.

15. The one or more non-transitory computer-readable media of claim 14, wherein determining the driving scenario comprises at least one of:
determining a driving maneuver to be performed by the first simulated vehicle, based at least in part on a state of the driving simulation during the first time period; or
determining an interaction between the first simulated vehicle and a second simulated vehicle in the driving simulation.

16. The one or more non-transitory computer-readable media of claim 14, the operations further comprising:
determining, during the second time period in the driving simulation, an ending of the driving scenario associated with the first simulated vehicle; and
controlling the first simulated vehicle using the first heuristic planner component, during a third time period in the driving simulation after the second time period, based at least in part on determining the ending of the driving scenario.

17. The one or more non-transitory computer-readable media of claim 14, wherein controlling the first simulated vehicle using the second machine-learned planner component comprises:
determining the second machine-learned planner component from a plurality of machine-learned planner components, based at least in part on the driving scenario.

18. The one or more non-transitory computer-readable media of claim 17, wherein the plurality of machine-learned planner components comprises at least two of:
a planner component including a neural network trained using supervised learning;
a planner component including a neural network trained using reinforcement learning; and
a planner component including a neural network trained using inverse reinforcement learning.

19. The one or more non-transitory computer-readable media of claim 14, wherein, at a first point in time during the driving simulation:
the first simulated vehicle is controlled by the first heuristic planner component; and
a second simulated vehicle is controlled by the second machine-learned planner component.

20. The one or more non-transitory computer-readable media of claim 14, wherein determining the driving scenario comprises determining an interaction in the driving simulation between the first simulated vehicle and a second simulated vehicle, the operations further comprising:
controlling, based at least in part on determining the interaction, the first simulated vehicle and the second simulated vehicle using the second machine-learned planner component.

* * * * *